(12) United States Patent
Williams et al.

(10) Patent No.: US 9,010,108 B2
(45) Date of Patent: Apr. 21, 2015

(54) TURBOCHARGER COMPRESSOR ROTOR ALIGNMENT SYSTEM

(71) Applicant: Williams International Co., L.L.C., Walled Lake, MI (US)

(72) Inventors: Thomas J. Williams, Milford Township, MI (US); Mark E. Suchezky, South Lyon, MI (US); Craig R. Miller, West Bloomfield, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 0 days.

(21) Appl. No.: 14/475,778

(22) Filed: Sep. 3, 2014

(65) Prior Publication Data
US 2014/0366526 A1  Dec. 18, 2014

Related U.S. Application Data

(63) Continuation of application No. 13/845,429, filed on Mar. 18, 2013, which is a continuation of application No. 13/531,577, filed on Jun. 24, 2012, now abandoned, and a continuation-in-part of application No. 12/690,767, filed on Jan. 20, 2010, now Pat. No. 8,418,458.

(60) Provisional application No. 61/501,891, filed on Jun. 28, 2011, provisional application No. 61/145,791, filed on Jan. 20, 2009.

(51) Int. Cl.
| | | |
|---|---|---|
| F01D 25/16 | (2006.01) | |
| F01D 25/26 | (2006.01) | |
| F01D 25/24 | (2006.01) | |
| F02C 6/12 | (2006.01) | |
| F02B 37/00 | (2006.01) | |
| F04D 25/02 | (2006.01) | |

(52) U.S. Cl.
CPC .............. *F01D 25/265* (2013.01); *F01D 25/16* (2013.01); *F01D 25/24* (2013.01); *F02C 6/12* (2013.01); *F05D 2220/40* (2013.01); *F02B 37/00* (2013.01); *F04D 25/024* (2013.01); *F05D 2260/30* (2013.01)

(58) Field of Classification Search
CPC ....... F01D 25/16; F01D 25/24; F01D 25/265; F02B 37/00; F02C 6/12; F04D 25/024; F05D 2220/40; F05D 2260/30
USPC .............................................. 415/206; 60/598
See application file for complete search history.

(56) References Cited

U.S. PATENT DOCUMENTS

| | | | | | |
|---|---|---|---|---|---|
| 2,695,131 | A | * | 11/1954 | Price | 415/206 |
| 4,986,733 | A | * | 1/1991 | Fleury et al. | 417/407 |
| 5,584,586 | A | * | 12/1996 | Casarcia et al. | 384/625 |

* cited by examiner

*Primary Examiner* — Mary A Davis
(74) *Attorney, Agent, or Firm* — Raggio & Dinnin, P.C.

(57) ABSTRACT

An aftwardly-extending internally-threaded boss of a boreless-hub compressor rotor of a turbocharger engages a corresponding externally-threaded forward end portion of an associated rotor shaft of the turbocharger, wherein an internal surface of an inner race of an associated rolling-element bearing of the turbocharger is in engagement with both an external surface of the rotor shaft and an external surface of the internally-threaded boss of the boreless-hub compressor rotor, wherein the rotor shaft extends through the inner race of the rolling-element bearing.

5 Claims, 22 Drawing Sheets and turbocharger core from the first aspect of an internal combustion engine illustrated in FIG. 1;

TURBOCHARGER COMPRESSOR ROTOR ALIGNMENT SYSTEM

CROSS-REFERENCE TO RELATED APPLICATIONS

The instant application is a continuation of U.S. application Ser. No. 13/845,429 filed on 18 Mar. 2013, which is a continuation of U.S. application Ser. No. 13/531,577 filed on 24 Jun. 2012, which claims the benefit of prior U.S. Provisional Application Ser. No. 61/501,891 filed on 28 Jun. 2011. U.S. application Ser. No. 13/531,577 is a continuation-in-part of U.S. application Ser. No. 12/690,767 filed on 20 Jan. 2010, which claims the benefit of prior U.S. Provisional Application Ser. No. 61/145,791 filed on 20 Jan. 2009. Each of the above-identified applications is incorporated by reference herein in its entirety.

DESCRIPTION OF EMBODIMENT(S)

Figure 1:
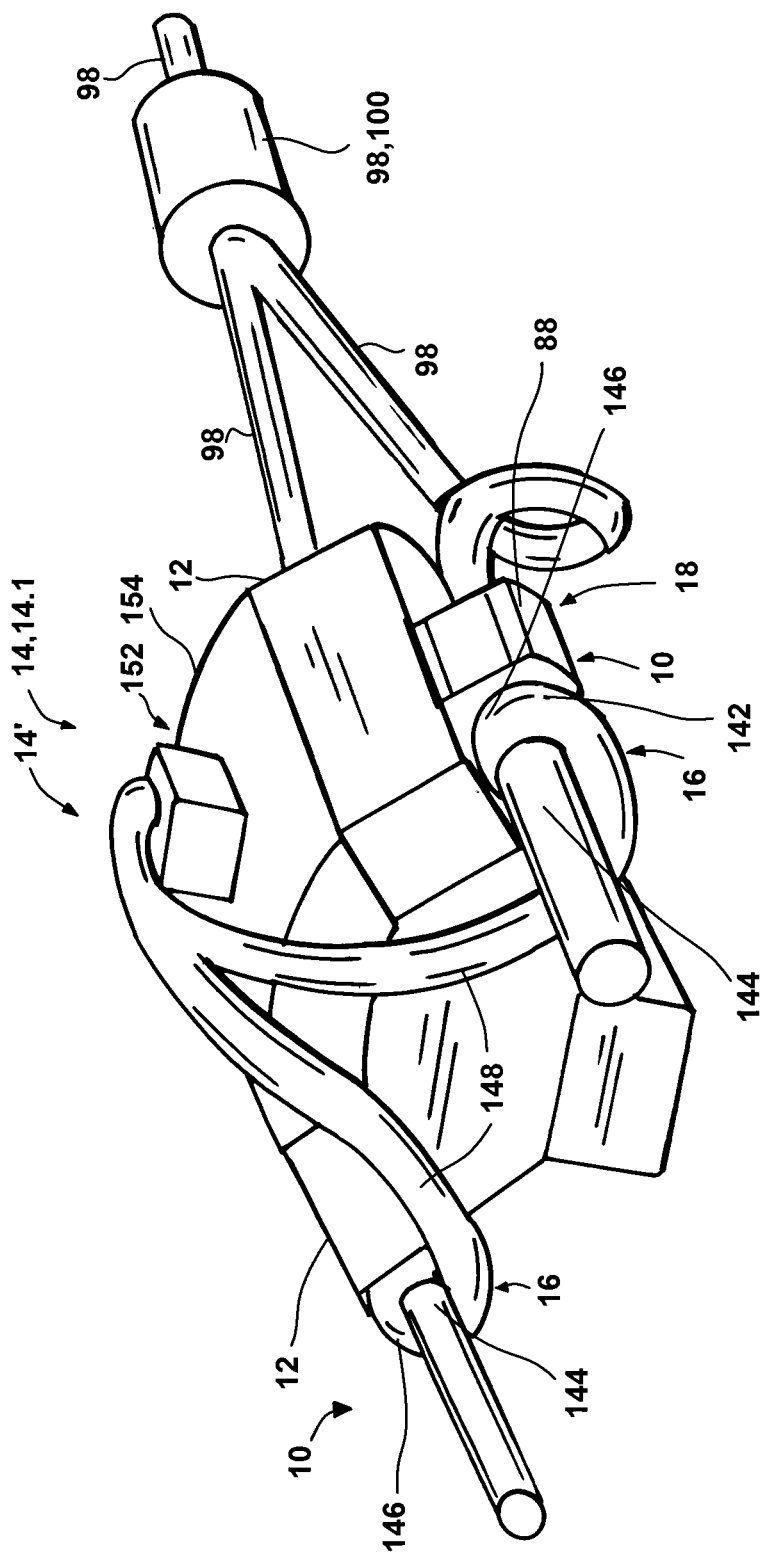
FIG. 1 illustrates an isometric view of a first aspect of an internal combustion engine comprising a pair of cylinder heads and a corresponding pair of turbocharger cores integrated therewith.
Figure 2:
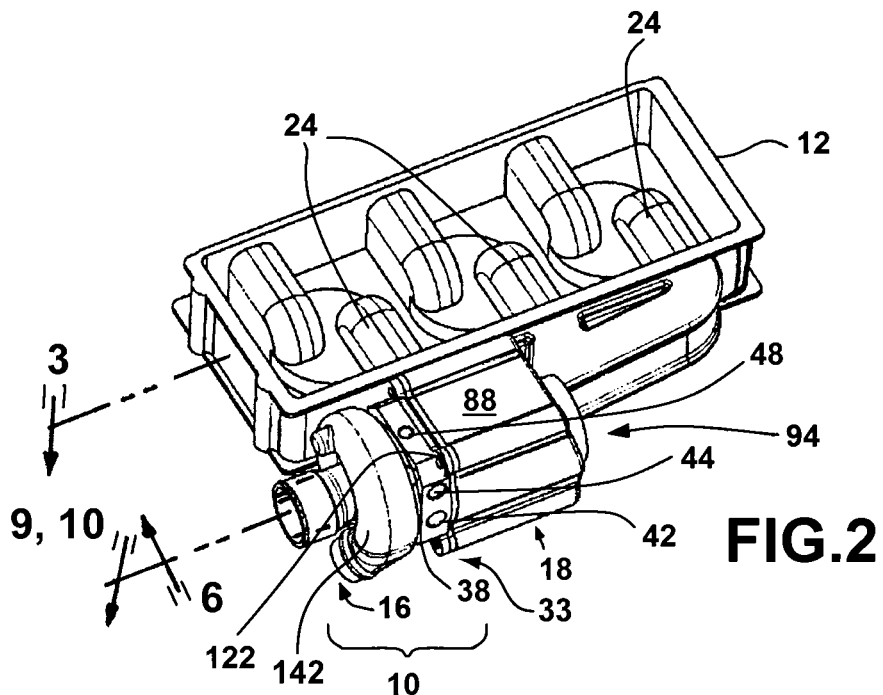
FIG. 2 illustrates an isometric view of a cylinder head and turbocharger core from the first aspect of an internal combustion engine illustrated in FIG. 1.
Figure 3:
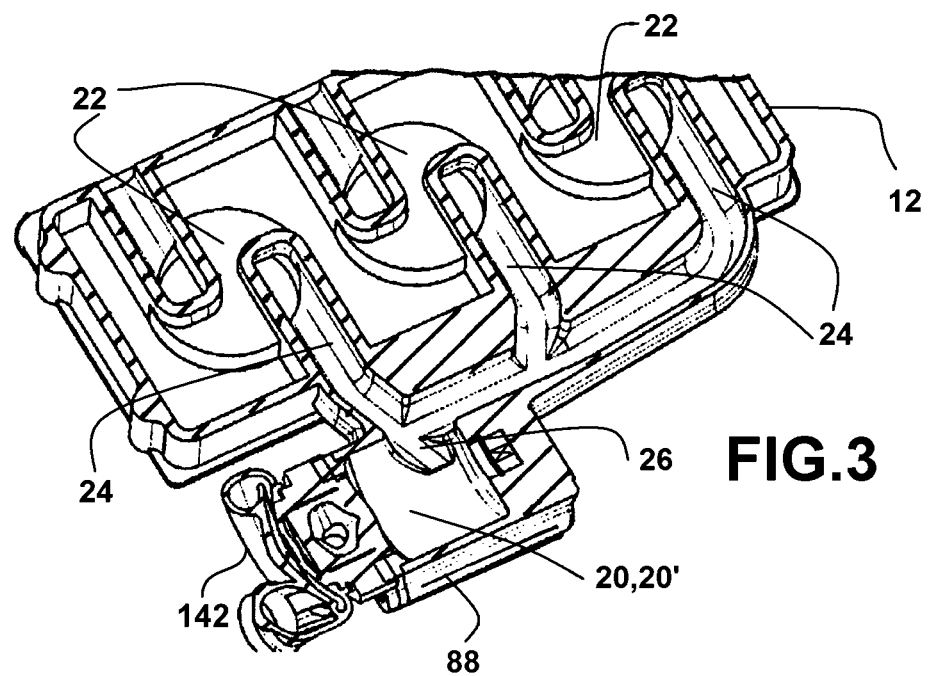
FIG. 3 illustrates first cross-sectional view through the cylinder head and turbocharger core illustrated in FIG. 2.
Figure 4:
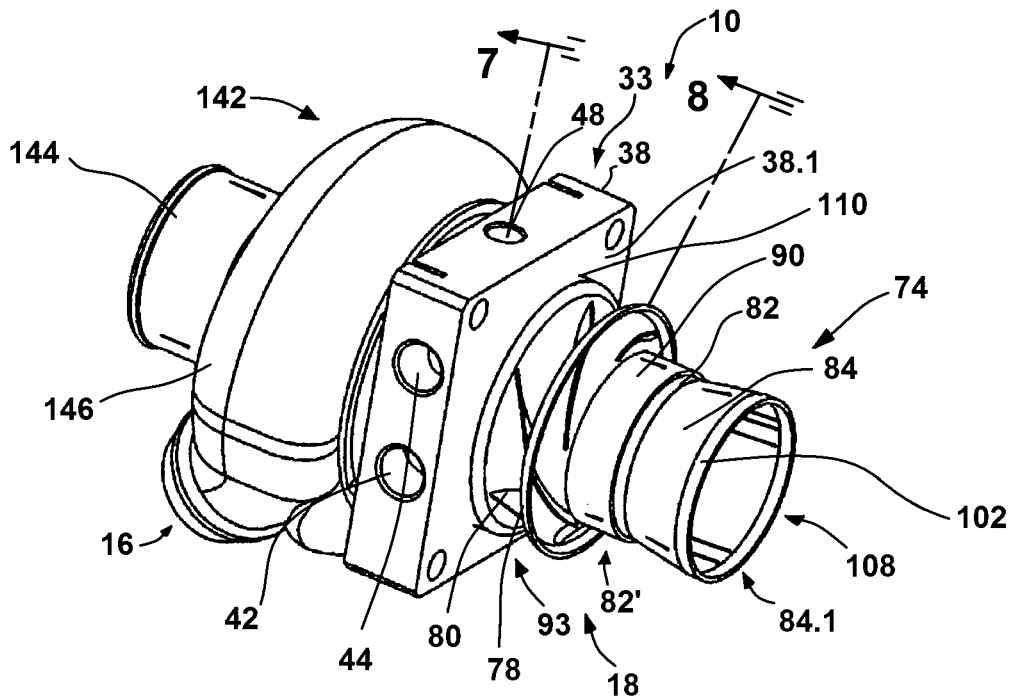
FIG. 4 illustrates an isometric view of the turbocharger core as used in the embodiments illustrated in FIGS. 1-3.
Figure 5:
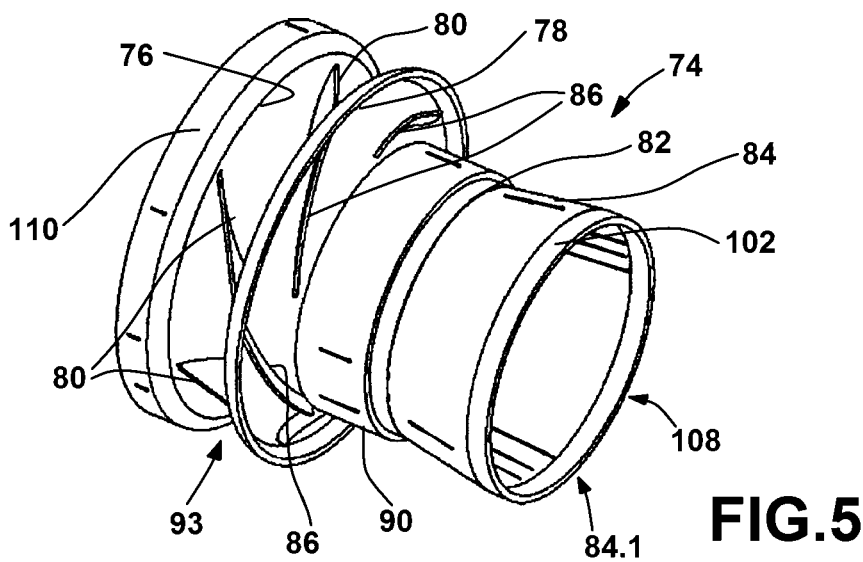
FIG. 5 illustrates an isometric view of a nozzle cartridge assembly from the turbocharger core illustrated in FIG. 2.
Figure 6:
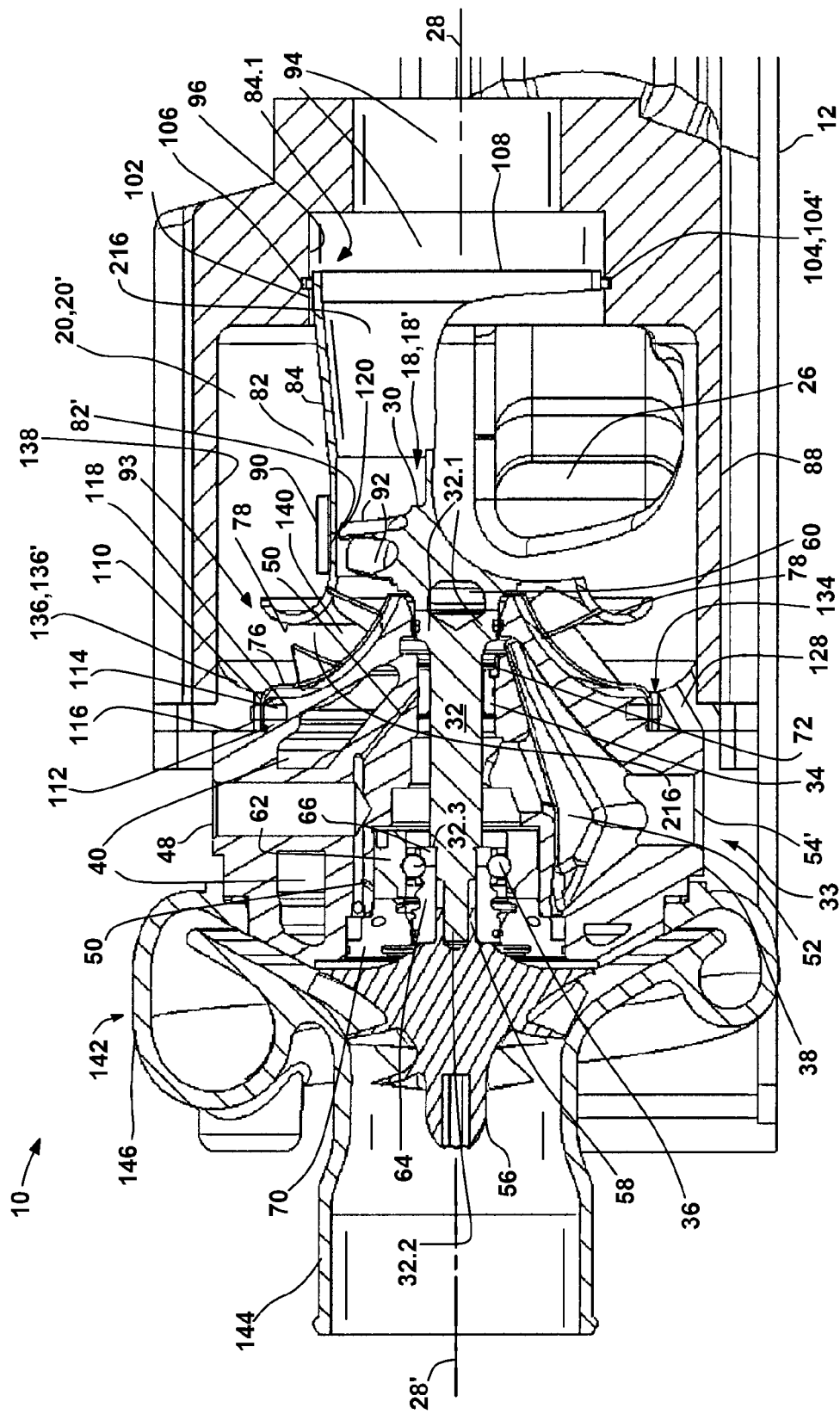
FIG. 6 illustrates a second cross-sectional view through the cylinder head and turbocharger core illustrated in FIG. 2.
Figure 7:
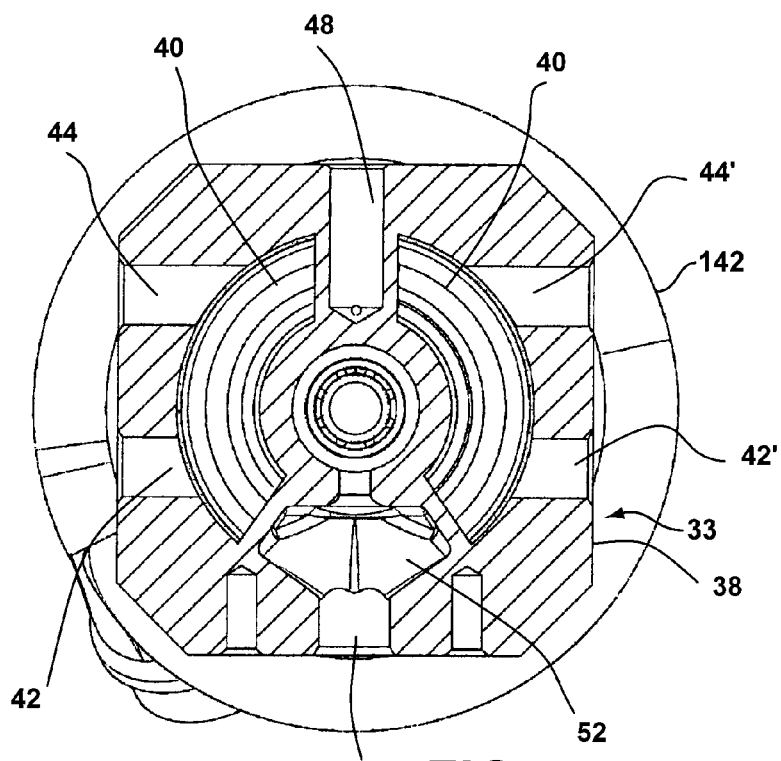
FIG. 7 illustrates a transverse cross-sectional view through a turbine nozzle portion of the turbocharger core illustrated in FIG. 4.
Figure 8:
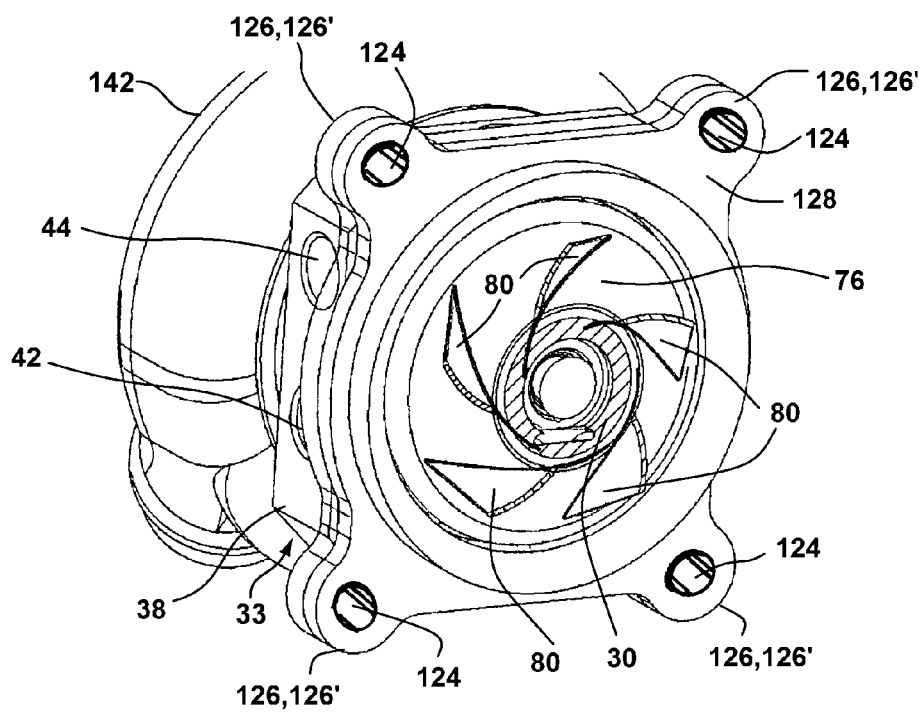
FIG. 8 illustrates a transverse cross-sectional view through a bearing housing portion of the turbocharger core illustrated in FIG. 4.
Figure 9:
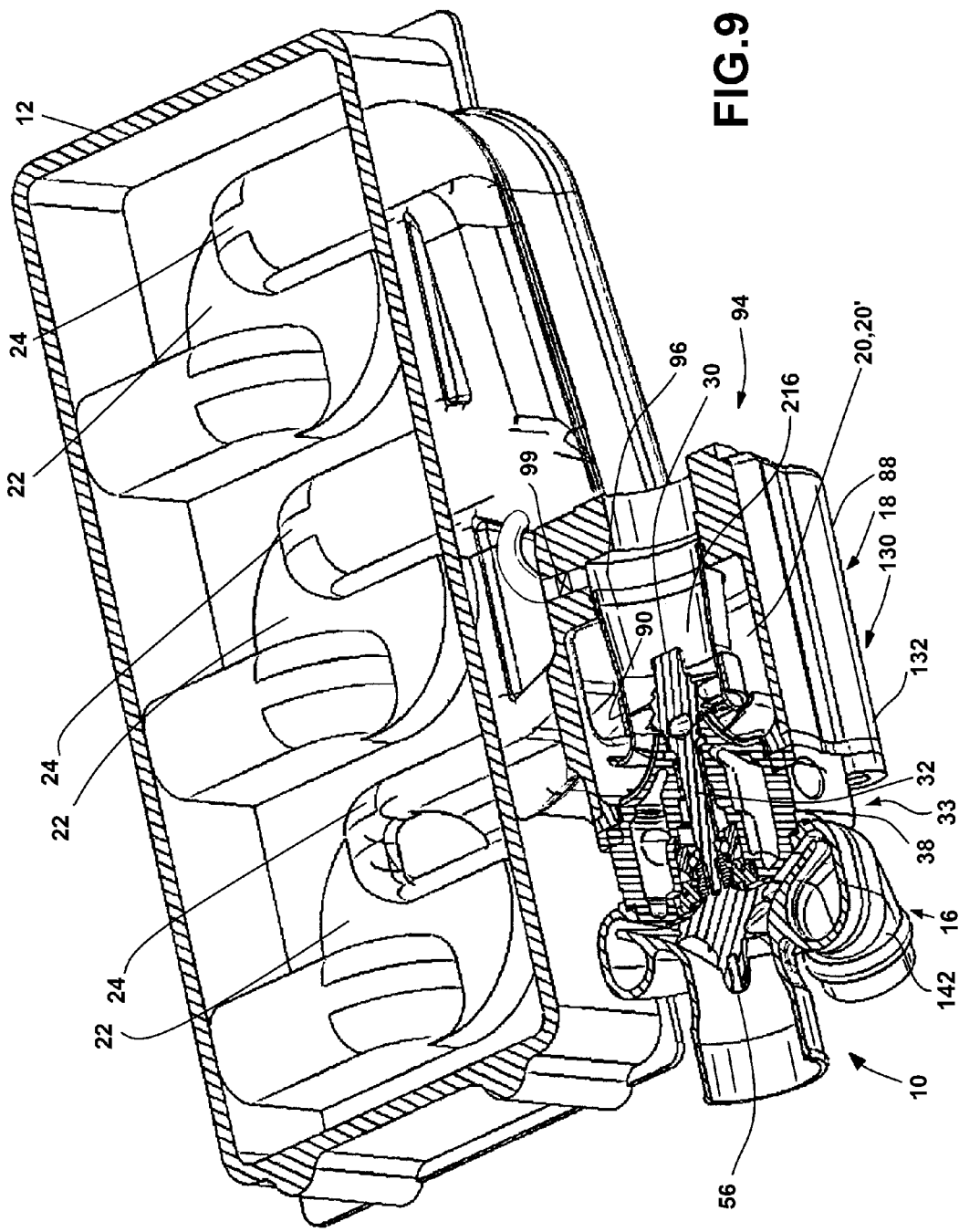
FIG. 9 illustrates third cross-sectional view through the cylinder head and turbocharger core illustrated in FIG. 2.
Figure 10:
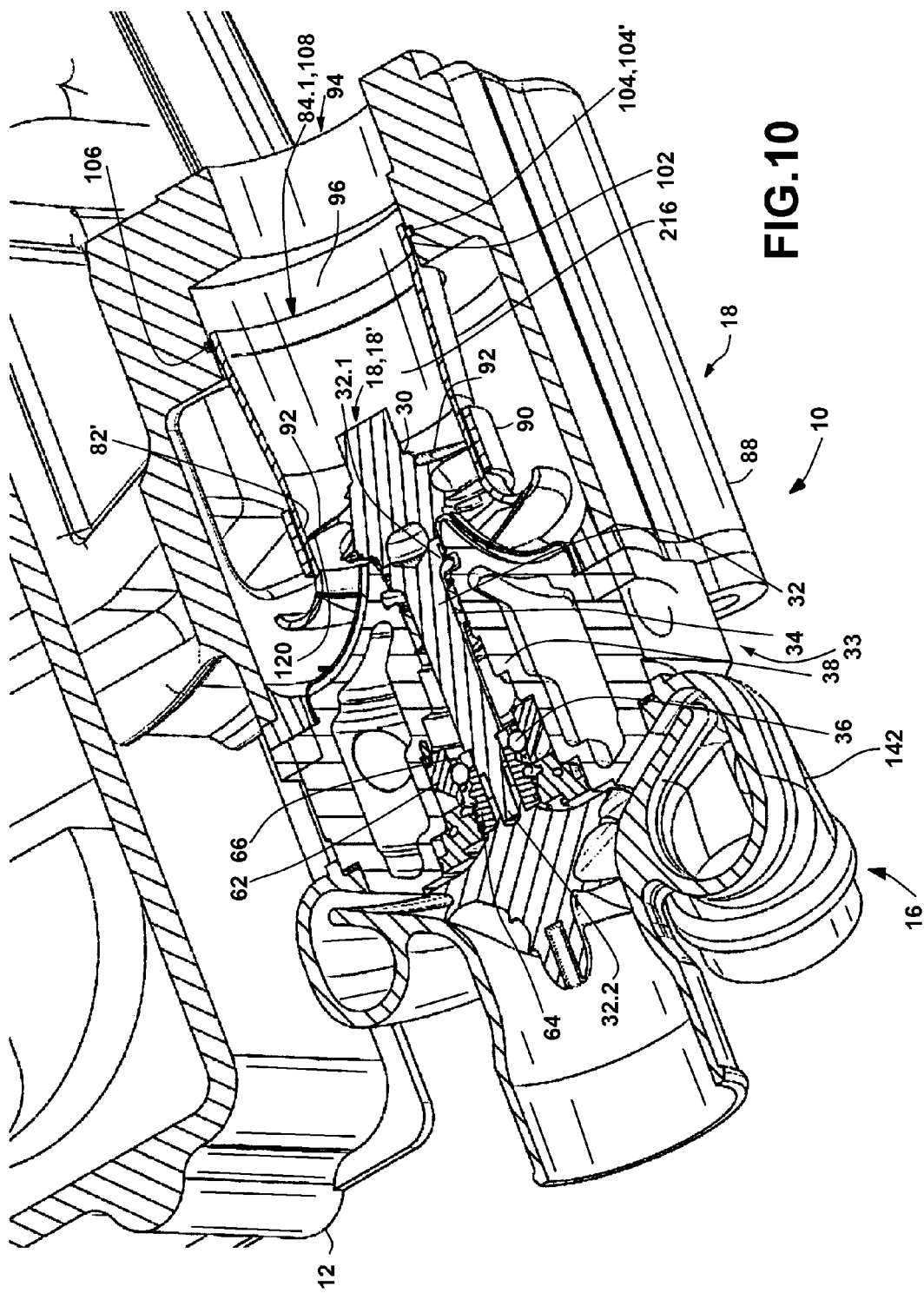
FIG. 10 illustrates an expanded view of a portion of the third cross-sectional view through the cylinder head and turbocharger core illustrated in FIG. 9.

Referring to FIG. 1, a pair of turbocharger cores 10 are integrated with a corresponding pair of cylinder head assemblies 12 of a first aspect of an internal combustion engine 14, 14.1 of a V-type configuration, for example, a V-6 internal combustion engine 14, 14.1. For example, the internal combustion engine 14, 14.1 can be any of a variety of designs operating on one or more of a variety of types of fuels, including but not limited to gasoline, diesel, bio-diesel, natural gas, including LNG and CNG, propane including LP gas, ethanol or methanol, in accordance with any one of a variety of thermodynamic cycles, including, but not limited to, for example, the Otto cycle, the Diesel cycle, the Atkinson cycle, the Miller cycle or a two-stroke cycle. Referring also to FIGS. 2-10, each turbocharger core 10 comprises a compressor 16 driven by an exhaust-powered turbine 18, wherein when the turbocharger core 10 is attached to the internal combustion engine 14, 14.1, for example, through an intercooler, each associated turbine 18 is inserted in and cooperates with a cavity 20, for example, a cylindrical cavity 20' or a volute cavity 20", in the corresponding cylinder head assembly 12 adapted to receive exhaust gases 21 from the associated cylinder or cylinders 22 associated therewith via associated exhaust runners 24. For example, the turbocharger core 10 incorporates an axial-flow turbine 18', which can be configured with a relatively low associated moment of inertia so as to provide for a relatively rapid dynamic response to changes in the associated operating condition of the internal combustion engine 14, 14.1. In the first aspect of the internal combustion engine 14, 14.1, the exhaust runners 24 from each cylinder 22 communicate with a common first exhaust port 26 in the side of the cavity 20 at a location off-axis relative to the central axis 28 of the cavity 20 so as to induce a circulation of the exhaust gases 21 flowing thereinto.

The turbocharger core 10 comprises a turbine rotor 30 of a turbocharger rotor assembly 31 operatively coupled to an aft end 32.1 of a rotor shaft 32 of the turbocharger rotor assembly 31 that is rotationally supported by rotor shaft support assembly 33, also known as a centerbody 33, comprising an aft journal bearing 34 and a forward rolling element bearing 36 located within an associated bearing housing 38 and spaced apart from one another along the rotor shaft 32. The bearing housing 38 incorporates a cooling jacket 40 therewithin in fluid communication with inlet 42 and outlet 44 ports that are adapted to receive a flow of cooling water from the water cooling system 46 of the internal combustion engine 14, 14.1 and thereby provide for cooling the aft journal bearing 34 and the forward rolling element bearing 36, wherein one set of inlet 42 and outlet 44 ports is used for one side of the internal combustion engine 14, 14.1, and the other one set of inlet 42' and outlet 44' ports is used for the other side of the internal combustion engine 14, 14.1, with the unused set of inlet 42', 42 and outlet 44', 44 ports on either side being plugged. An oil inlet port 48 is adapted to receive a supply of pressurized engine oil from an oil pump of the internal combustion engine 14, 14.1 and distribute this oil to the aft journal bearing 34 and the forward rolling element bearing 36 via associated oil distribution passages 50. Oil draining from aft journal bearing 34 and the forward rolling element bearing 36 is gravity collected in an oil scavenge cavity 52 within the base of the bearing housing 38, and is returned to the internal combustion engine 14, 14.1 via an associated oil scavenge line 54 (illustrated in FIG. 13) connected to an associated oil scavenge port 54' at the base of the bearing housing 38.

It should be understood that the rotor shaft support assembly 33 is not limited to the combination of an aft journal bearing 34 and a forward rolling element bearing 36, but the rotor shaft support assembly 33 could alternatively comprise any combination of journal and rolling element bearings, or conceivably a single extended-length journal bearing.

The compressor 16 of the turbocharger core 10 comprises a compressor rotor 56 of the turbocharger rotor assembly 31 operatively coupled to the forward end 32.2 of the rotor shaft 32 and adapted to rotate therewith about a central axis 28' of the turbocharger core 10, which is substantially aligned with the central axis 28 of the cavity 20. For example, in one embodiment, the compressor rotor 56—in accordance with what is known as a boreless hub,—incorporates an aftward extending internally threaded boss 58 that threads onto the forward end 32.2 of the rotor shaft 32, and the turbine rotor 30 is welded to the aft end 32.1 of the rotor shaft 32 along the periphery of a cavity 60 between the forward end of the turbine rotor 30 and the aft end 32.1 of the rotor shaft 32 that provides for reducing heat transfer from the turbine rotor 30 to the rotor shaft 32. The forward rolling element bearing 36 comprises an outer race 62 and forward 64 and aft 66 inner races located on the rotor shaft 32 between a shoulder 32.3 and the compressor rotor 56, which provides for positioning the rotor shaft 32 within the bearing housing 38. The bearing housing 38 incorporates forward 70 and aft 72 seals that provide for preventing leakage of oil from the bearing housing 38 into either the turbine 18 or compressor 16 of the turbocharger core 10.

Referring to FIGS. 4, 5 6 and 8-10, the turbocharger core 10 further comprises a turbine nozzle cartridge assembly 74 operatively coupled to the aft side 38.1 of the bearing housing 38. The turbine nozzle cartridge assembly 74 comprises a forward nozzle wall 76, an aft nozzle wall 78 aftwardly separated therefrom, a plurality of vanes 80 disposed between the forward 76 and aft 78 nozzle walls, a turbine rotor shroud portion 82 extending aftward from the aft nozzle wall 78, and a nozzle exhaust portion 84 extending aftward from the throat portion 82. Although the nozzle exhaust portion 84 is illustrated with a relatively expanded diameter so as to provide for at least partially diffusing the associated exhaust gases, the nozzle exhaust portion 84 need not necessarily be relatively expanded in diameter relative to the associated turbine rotor shroud portion 82.

For example, in one embodiment, the forward nozzle wall 76 is formed as a first sheet metal element and the combination of the aft nozzle wall 78 and turbine rotor shroud 82 and nozzle exhaust 84 portions is formed as a second sheet metal element,—for example, each by stamping or spinning;—and the vanes 80 are each formed from sheet metal—, for example, by stamping,—and inserted in and then welded or brazed to a plurality of corresponding slots 86 in each of the forward 76 and aft 78 nozzle walls. In another embodiment, the aft nozzle wall 78, the turbine rotor shroud portion 82 and the nozzle exhaust portion 84 are each formed from two or more separate sheet metal pieces that that are then joined together, for example, by welding, brazing and/or by press-fitting. Alternatively, the turbine nozzle cartridge assembly 74 may be cast or sintered, for example, laser sintered. The turbine nozzle cartridge assembly 74 is constructed of a material that can withstand high temperature exhaust gases 21, for example, of a nickel alloy, for example, stainless steel with a relatively high nickel content, for example, 310 stainless steel, that provides for high temperature oxidation resistance and strength. The remainder of the turbocharger core 10—being either water- or oil-cooled,—can be constructed of less exotic and more economical materials, such as aluminum or cast iron. For example, in addition to the water-cooled bearing housing 38, the cylinder head assembly 12 may be adapted with water cooling passages in thermal communication with the exhaust housing portion 88 thereof so as to provide using relatively low-cost materials, such as aluminum, for the construction thereof. Accordingly, the separate turbine nozzle cartridge assembly 74 of the turbocharger core 10 provides for an overall more economical use of high-temperature-tolerant materials—for example, limited to the turbine nozzle cartridge assembly 74—than would otherwise be possible, and also provides for integrating the turbocharger core 10 into the cylinder head assembly 12. For example, the combined amount of raw material needed to make the turbine nozzle cartridge assembly 74 and the relatively more simple associated exhaust housing portion 88 of the cylinder head assembly 12 would be less than the amount of material needed to make an equivalent conventional turbocharger exhaust housing.

In yet another embodiment, the turbine rotor shroud portion 82 of the turbine nozzle cartridge assembly 74 is reinforced with a containment sleeve 90 that provides for containing the turbine rotor 30 in the event of a failure of the associated turbine blades 92 thereof.

The turbine nozzle cartridge assembly 74 extends through the cavity 20, 20', 20" in the cylinder head assembly 12. In operation, exhaust gases 21 from the cylinder or cylinders 22 flow through the associated exhaust runners 24 into the first exhaust port 26, i.e. a cavity inlet exhaust port 26, leading into the cavity 20, 20', 20", wherein the off-axis location of the first exhaust port 26 relative to the cavity 20, 20', 20" causes a swirl of the exhaust gases 21 flowing within the cavity 20, 20', 20". The exhaust gases 21 then flow with swirl into the peripheral inlet 93 of the turbine nozzle cartridge assembly 74 along the vanes 80 thereof, and against the turbine blades 92 of the turbine rotor 30, thereby driving the turbine rotor 30 that in turn rotates the rotor shaft 32 and the compressor rotor 56 attached thereto. The exhaust gases 21 then flow through the nozzle exhaust portion 84 of the turbine nozzle cartridge assembly 74 before being exhausted into and through a second exhaust port 94, i.e. a cavity outlet exhaust port 94, that extends from a counterbore 96 in the aft end 20.1 of the cavity 20, 20', 20", wherein the second exhaust port 94 is connected to the engine exhaust system 98, which, for example, may include one or more exhaust treatment devices 100, for example, one or more catalytic converters or mufflers. The cylinder head assembly 12 can incorporate a wastegate valve 99 operative between an exhaust runner 24 and the second exhaust port 94 so as to provide for bypassing exhaust gases 21 directly to the engine exhaust system 98 without first flowing through the turbine nozzle cartridge assembly 74 and associated turbine rotor 30. Accordingly, the forward 76 and aft 78 nozzle walls of the turbine nozzle cartridge assembly 74 redirect and accelerate the circumferentially swirling exhaust gases 21—flowing within the cavity 20, 20', 20" outside of the turbine nozzle cartridge assembly 74—radially inward and axially aftward, and the resulting axially-aftward-flowing swirling exhaust gases 21 then impinge upon the turbine blades 92 of the turbine rotor 30, thereby driving the turbine rotor 30, wherein in one embodiment, the associated vanes 80 in cooperation with the forward 76 and aft 78 nozzle walls are adapted to provide for the proper vector orientation of the impinging exhaust gases 21 relative to the turbine rotor 30 so as to maximize the efficiency of the turbine 18.

The aft end 84.1 of the nozzle exhaust portion 84 of the turbine nozzle cartridge assembly 74 incorporates an external sealing surface 102 that cooperates with a seal ring 104—for example, a piston-ring-type seal ring 104'—located in an internal groove 106 in the counterbore 96 so as to provide for sealing the discharge end 108 of the turbine nozzle cartridge assembly 74 to the exhaust housing portion 88 of the cylinder head assembly 12 so that substantially all of the exhaust gases 21 are discharged from the turbine nozzle cartridge assembly 74 into and through the second exhaust port 94 and into the associated engine exhaust system 98, thereby substantially isolating the exhaust gases 21 in the cavity 20, 20', 20" upstream of the turbine nozzle cartridge assembly 74 from the exhaust gases 21 discharged from the turbine nozzle cartridge assembly 74. The seal ring 104 in cooperation with the external sealing surface 102 provides for enabling discharge end 108 of the turbine nozzle cartridge assembly 74 to both slide in an axial direction and expand or contract in a radial direction, responsive to thermally-induced expansion or contraction thereof, while maintaining the sealing condition at the discharge end 108 of the turbine nozzle cartridge assembly 74, without substantial associated thermally-induced loading of the turbine nozzle cartridge assembly 74.

The forward end 76.2 of the forward nozzle wall 76 comprises a cylindrical lip 110 that fits over a corresponding cylindrical step 112 that extends aftwardly from the aft side 38.1 of the bearing housing 38. The turbine nozzle cartridge assembly 74 is retained on the bearing housing 38 by a plurality of radial pins 114 that extend through corresponding radial holes 116 in the cylindrical lip 110 and into corresponding blind radial holes 118 in the cylindrical step 112. The radial pins 114 and associated radial holes 116, 118 are located symmetrically around the circumferences of the cylindrical lip 110 and the cylindrical step 112. The inside diameter of the cylindrical lip 110 and the outside diameter of the cylindrical step 112 may be adapted so that at ambient temperature, the cylindrical lip 110 has an interference fit with the cylindrical step 112. However, at elevated operating temperatures, the forward nozzle wall 76 and associated cylindrical lip 110 are free to thermally expand relative to cylindrical step 112 responsive to differences in temperature or thermal expansion rates of the forward nozzle wall 76 and bearing housing 38, respectively, in which case, the engagement of the cylindrical lip 110 by the radial pins 114 provides for retaining the turbine nozzle cartridge assembly 74 to the bearing housing 38, and the symmetric arrangement of the associated radial pins 114 and associated radial holes 116, 118 provides for keeping the turbine nozzle cartridge assembly 74 substantially concentric with the central axis 28' of the turbocharger core 10 over the thermal operating range thereof. For example, during normal operation, the turbine nozzle cartridge assembly 74 would heat up relatively more quickly, and to a substantially higher temperature, than the bearing housing 38, and as a result the inside diameter of the cylindrical lip 110 would typically expand so as to be greater than the outside diameter of the cylindrical step 112, so as to transition from a possible interference at ambient temperature to a substantially loose fit at elevated temperatures, under which circumstances, the radial pins 114 would provide for symmetrically and concentrically retaining the cylindrical lip 110 on the cylindrical step 112, so as to preserve the relative alignment of the turbine nozzle cartridge assembly 74 with the associated turbine rotor 30.

Alternatively, the forward end 76.2 of the forward nozzle wall 76 can be centered on the bearing housing 38 with a plurality of aftwardly-extending axial pins or bolts extending from the aft side 38.1 of the bearing housing 38 through corresponding radial slots in the forward end 76.2 of the forward nozzle wall 76, and retained on the bearing housing 38 either by the bolts or by a step in the forward end of the cavity 20.

When the turbine nozzle cartridge assembly 74 is assembled to the bearing housing 38, the turbine blades 92 of the turbine rotor 30 are located within the turbine rotor shroud portion 82 of the turbine nozzle cartridge assembly 74, which turbine rotor shroud portion 82 accordingly functions as a turbine tip shroud 82', wherein the inside diameter of the turbine tip shroud 82' is adapted to provide for about 0.01 inch of tip clearance 212 to the tips 120 of the turbine blades 92, which relatively tight tolerance provides for improved efficiency of the turbine 18 that might otherwise be possible had the clearance been larger. Accordingly, with the turbine tip shroud 82' a part the turbine nozzle cartridge assembly 74 that is retained on the bearing housing 38 and free to float within the counterbore 96 in the cavity 20, 20', 20", the turbine tip shroud 82' is unaffected by the exhaust housing portion 88 of the cylinder head assembly 12, for example, by thermally-induced stresses therein or therefrom, or external mechanical loads thereto, that might otherwise result in interference with the tip 120 of the turbine blades 92, so that a relatively small clearance between the turbine tip shroud 82' and the tip 120 of the turbine blades 92 can be readily realized using production hardware and processes.

The turbocharger core 10 is assembled to the cylinder head assembly 12 with a plurality of bolts 122 through a corresponding plurality of holes 124 in an associated flange 126 or set of flanges 126 of or extending from the bearing housing 38, through an adapter bushing 128, and into corresponding threaded holes 130 in the forward portion 132 of the exhaust housing portion 88 of cylinder head assembly 12 around the periphery of the of the cavity 20, 20', 20", so that when mounted to the cylinder head assembly 12, the bearing housing 38 of the turbocharger core 10 provides for closing the forward end of the cavity 20, which is sealed at the junction of the bearing housing 38 and adapter bushing 128 and the junction of the adapter bushing 128 and the forward portion 132 of the exhaust housing portion 88 of cylinder head assembly 12 around the periphery of the of the cavity 20, 20', 20" for example, either by mating flat surfaces—as illustrated—or by mating conical surfaces. The inside diameter of the adapter bushing 128 is sufficiently greater that the outside diameter of the cylindrical lip 110 of the forward nozzle wall 76 of the turbine nozzle cartridge assembly 74 so as to provide for uninhibited thermally induced expansion of the cylindrical lip 110 within the gap 134 therebetween, so as to prevent a thermally-induced mechanical stress of the turbine nozzle cartridge assembly 74 that would otherwise occur if the outward radial expansion of the cylindrical lip 110 were otherwise restrained by the adapter bushing 128. The adapter bushing 128 also provides for capturing the radial pins 114 within their radial holes 118 in the cylindrical step 112. The aft surface 136 of the adapter bushing 128 is located and shaped so as to provide for a relatively smooth transition from the inside surface 138 of the cavity 20', 20" to the forward nozzle wall 76 so as to facilitate the flow of exhaust gases 21 from the cavity 20', 20" into the turbine nozzle cartridge assembly 74. For example, in one embodiment, the aft surface 136 of the adapter bushing 128 comprises a portion of a concave toroidal surface 136 that in cross-section provides for a quarter-round fillet between the inside surface 138 and the forward nozzle wall 76. Alternatively, the adapter bushing 128 can be replaced by incorporating the material thereof directly into the exhaust housing portion 88 of the cylinder head assembly 12. Furthermore, alternatively, the turbocharger core 10 may be mounted to the forward portion 132 of the exhaust housing portion 88 of cylinder head assembly 12 with a V-clamp rather than bolts 122.

In operation of the turbocharger core 10, exhaust gases 21 from the first exhaust port 26 are first collected in the annulus 140 defined by portion of the cavity 20, 20', 20" of the exhaust housing portion 88 of the cylinder head assembly 12 on the outside of the turbine nozzle cartridge assembly 74, and then accelerated therefrom by the turbine nozzle cartridge assembly 74 into the turbine blades 92 of the turbine rotor 30. The turbine nozzle cartridge assembly 74 provides for directing and accelerating exhaust flow into the turbine blades 92 of the turbine rotor 30, and controlling the associated mass flow of these exhaust gases 21. Accordingly, the turbine nozzle cartridge assembly 74 can be configured—independent of the design of the cavity 20, 20', 20" or the associated exhaust housing portion 88 of the cylinder head assembly 12, for example, by adjusting the area/radius ratio (A/R) of the passage 140 through the turbine nozzle cartridge assembly 74—so as to adapt to the particular turbocharging requirements of a given internal combustion engine 14, 14.1, which provides for simplifying the process of tuning the turbocharger core 10 to the internal combustion engine 14, 14.1 because the only component to be changed in that process would be the turbine nozzle cartridge assembly 74. For example, in one set of embodiments, the forward 76 and aft 78 nozzle walls comprise corresponding forward 76' and aft 78' curved swept surfaces, the shapes of which may be adapted in cooperation with the associated vanes 80 to provide for tuning the turbocharger core 10.

Responsive to exhaust gases 21 impinging thereupon, the turbine rotor 30 of the turbine 18 of the turbocharger core 10 drives the rotor shaft 32 that rotates in the aft journal bearing 34 and forward rolling element bearing 36 in the bearing housing 38 and in turn drives the compressor rotor 56 that rotates within an associated compressor housing 142 of the associated compressor 16, which provides for compressing air from a central inlet 144 to the compressor housing 142, and discharging the compressed air through a volute diffuser 146 surrounding the compressor rotor 56. The compressed air is discharged from the compressor 16 into a conduit 148 that is coupled to an inlet plenum 150, for example, coupled to or surrounding a throttle body 152 coupled to an inlet manifold 154 of the internal combustion engine 14, 14.1.

Figure 11:
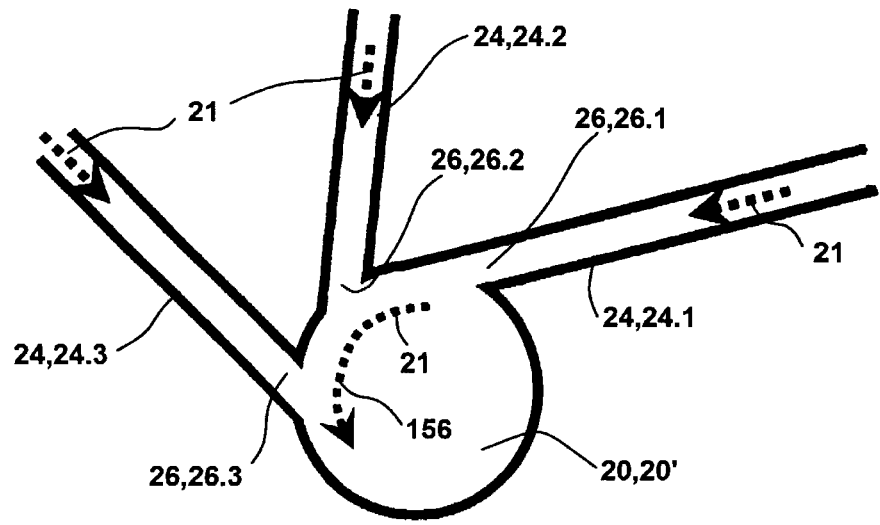
FIG. 11 illustrates a schematic view of a first alternative embodiment of an interface of a plurality of exhaust runners from each of a plurality of cylinders with a cavity in a cylinder head adapted to receive a turbocharger core.
Figure 12:
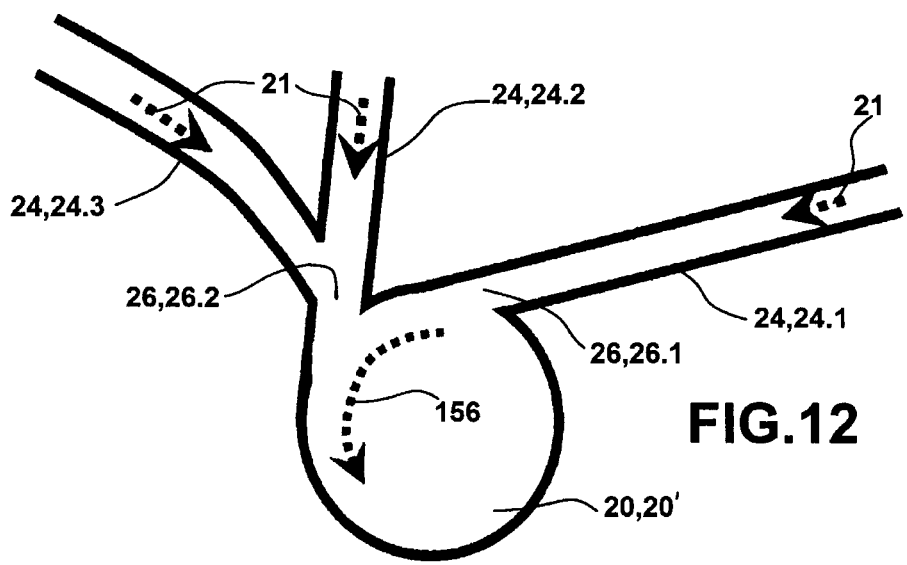
FIG. 12 illustrates a schematic view of a second alternative embodiment of an interface of a plurality of exhaust runners from each of a plurality of cylinders with a cavity in a cylinder head adapted to receive a turbocharger core.

Referring to FIGS. 11 and 12, in accordance with respective first and second alternative embodiments, the cavity 20, 20', 20" of the exhaust housing portion 88 of the cylinder head assembly 12 may be configured to receive exhaust gases 21 from a plurality of first exhaust ports 26, 26.1, 26.2, 26.3, each operatively associated with one or more associated exhaust runners 24, 24.1, 24.2, 24.3, each exhaust runner 24 operatively associated with one or more cylinders 22 of the internal combustion engine 14, 14.1, wherein for each first exhaust port 26, 26.1, 26.2, 26.3, each corresponding associated exhaust runner 24, 24.1, 24.2, 24.3 is oriented so as to introduce exhaust gases 21 substantially tangentially into the cavity 20, 20', 20" so that the resulting flow of exhaust gases 21 in the cavity 20, 20', 20" from each associated first exhaust port 26, 26.1, 26.2, 26.3 swirls in a common swirl direction 156. For example, referring to FIG. 11, in the first alternative embodiment, the cavity 20, 20', 20" is coupled to each of three different cylinders with three different exhaust runners 24, 24.1, 24.2, 24.3, each of which discharges exhaust gases 21 into the cavity 20, 20', 20" through a separate, corresponding first exhaust port 26, 26.1, 26.2, 26.3, wherein the associated exhaust runners 24, 24.1, 24.2, 24.3 are oriented so that all of the first exhaust port 26, 26.1, 26.2, 26.3 discharge exhaust gases 21 tangentially into the cavity 20, 20', 20" in a common swirl direction 156. Furthermore, referring to FIG. 12, in the second alternative embodiment, the cavity 20, 20', 20" is coupled to each of three different cylinders with three different exhaust runners 24, 24.1, 24.2, 24.3, two of which exhaust runners 24, 24.1, 24.2 discharge exhaust gases 21 into the cavity 20, 20', 20" through separate, corresponding first exhaust port 26, 26.1, 26.2, the third of which exhaust runners 24, 24.3 discharges exhaust gases 21 into the second exhaust runner 24, 24.2, which in turn discharges the exhaust gases 21 into the cavity 20, 20', 20" through the second of the plurality of first exhaust ports 26, 26.2, wherein the associated exhaust runners 24, 24.1, 24.2 are oriented so that both the first 26, 26.1 and second 26, 26.2 exhaust ports discharge exhaust gases 21 tangentially into the cavity 20, 20', 20" in a common swirl direction 156.

By incorporating the turbocharger core 10 in the associated cylinder head assembly 12, and providing for water-cooling the bearing housing 38 and the associated exhaust housing portion 88 of the cylinder head assembly 12 that surrounds the associated cavity 20, 20', 20" of the turbocharger core 10, the turbocharger core 10 provides for reducing the amount of high-temperature tolerant material, for example a relatively high nickel content alloy, than would otherwise be required for a corresponding comparable stand-alone turbocharger assembly, which provides for reducing cost in comparison with a stand-alone turbocharger assembly. Furthermore, the incorporation of the turbocharger core 10 in the associated cylinder head assembly 12 provides for more closely coupling the exhaust from the cylinders 22 of the internal combustion engine 14, 14.1 to the turbocharger core 10, which provides for improved efficiency than would otherwise be possible with a corresponding comparable stand-alone turbocharger assembly.

Figure 13:
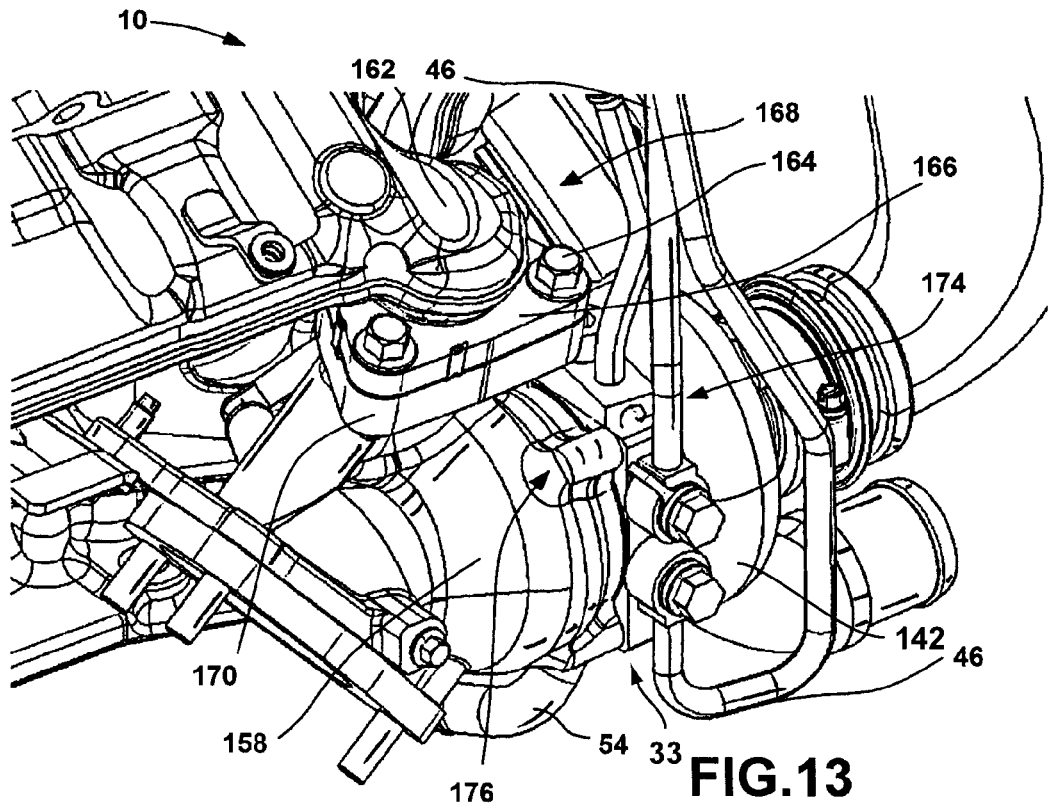
FIG. 13 illustrates an isometric view of a portion of a second aspect of an internal combustion engine incorporating a first embodiment of a first aspect of a turbocharger assembly operatively coupled to an associated exhaust manifold.
Figure 14:
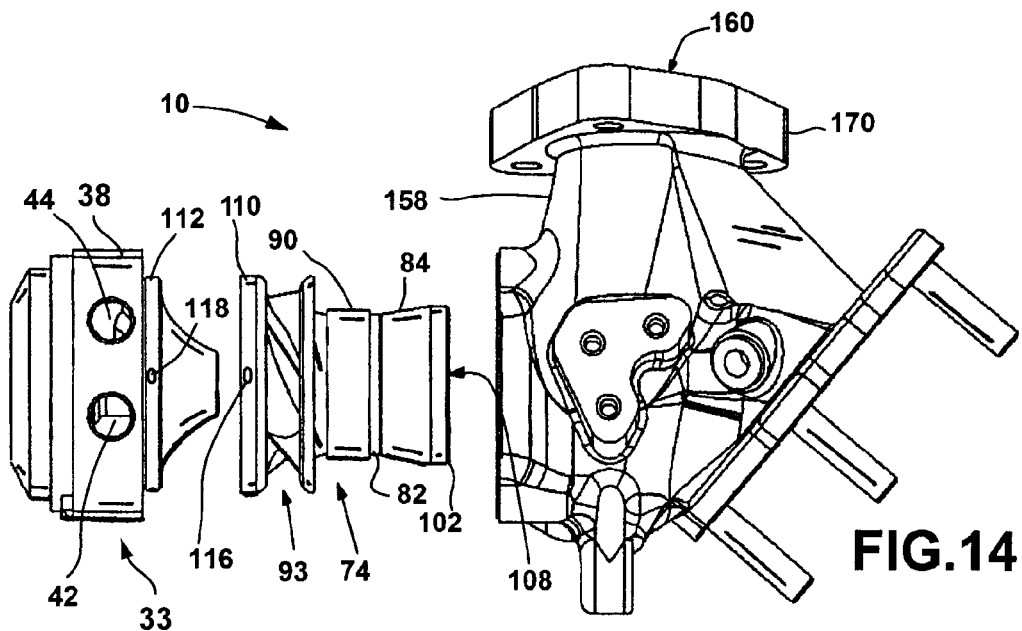
FIG. 14 illustrates an exploded view of portions of the first embodiment of the first aspect of the turbocharger assembly and associated housing used with the second aspect of the internal combustion engine illustrated in FIG. 13.
Figure 15:
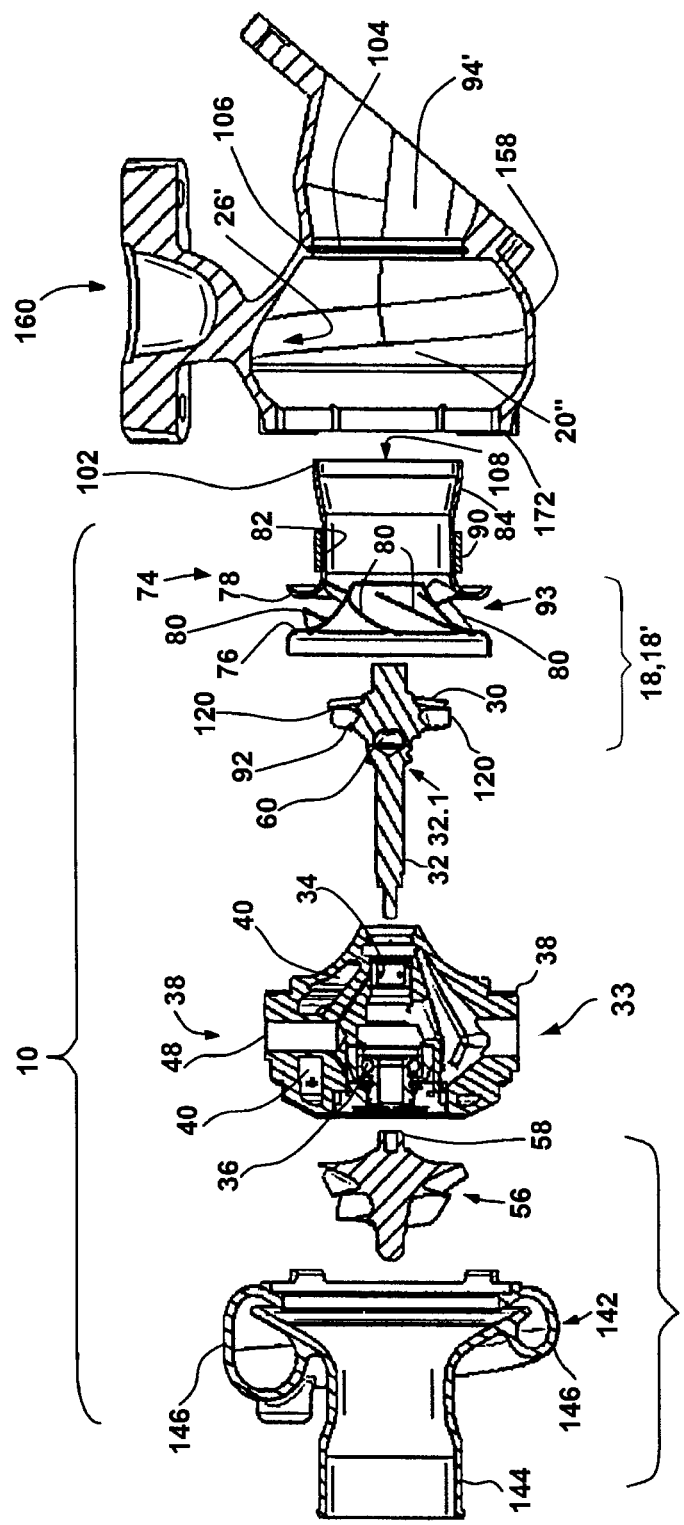
FIG. 15 illustrates a longitudinal cross-sectional exploded view of the first embodiment of the first aspect of the turbocharger assembly and associated housing used with the second aspect of the internal combustion engine illustrated in FIG. 13.

Referring to FIGS. 13-15, in accordance with a second aspect of an internal combustion engine and a first embodiment of an associated first aspect of a turbocharger assembly 200.1', the associated turbocharger core 10 cooperates with a separate turbocharger exhaust housing 158, an inlet 160 of which is operatively coupled to the exhaust manifold 162 of an internal combustion engine 14, 14.2, for example, with a plurality of bolts 164 through a first flange 166 at the outlet 168 of the exhaust manifold 162 into a second flange 170 at the inlet 160 of the turbocharger exhaust housing 158. The inlet 160 is in fluid communication with a cavity 20" in the turbocharger exhaust housing 158 via a first exhaust port 26' located so as to direct associated exhaust gases 21 off-center of the so as to induce a swirling flow of exhaust gases 21 therein. The bearing housing 38 of the turbocharger core 10, with the turbine nozzle cartridge assembly 74 attached thereto as described hereinabove, is bolted to a peripheral face 172 of the turbocharger exhaust housing 158 surrounding the cavity 20" with a plurality of bolts 174 through the bearing housing 38 and into associated threaded sockets 176 on the turbocharger exhaust housing 158 around the peripheral face 172, so that the associated turbine nozzle cartridge assembly 74 extends through the cavity 20" and into an associated second exhaust port 94' on the opposite side of the cavity 20". The second exhaust port 94' incorporates a seal ring 104 in an internal groove 106 that cooperates with the associated external sealing surface 102 on the aft end 84.1 of the nozzle exhaust portion 84 of the turbine nozzle cartridge assembly 74, so as to provide for sealing the discharge end 108 of the turbine nozzle cartridge assembly 74 to the turbocharger exhaust housing 158 so that substantially all of the exhaust gases 21 are discharged from the turbine nozzle cartridge assembly 74 into and through the second exhaust port 94 and into the associated engine exhaust system 98, thereby substantially isolating the exhaust gases 21 in the cavity 20" upstream of the turbine nozzle cartridge assembly 74 from the exhaust gases 21 discharged from the turbine nozzle cartridge assembly 74. The seal ring 104 in cooperation with the external sealing surface 102 provides for enabling discharge end 108 of the turbine nozzle cartridge assembly 74 to both slide in an axial direction and expand or contract in a radial direction, responsive to thermally-induced expansion or contraction thereof, while maintaining the sealing condition at the discharge end 108 of the turbine nozzle cartridge assembly 74, without substantial associated thermally-induced loading of the turbine nozzle cartridge assembly 74.

In operation, exhaust gases 21 from the exhaust manifold 162 flow into the inlet 160 of the turbocharger exhaust housing 158 and then into the associated cavity 20". The exhaust gases 21 swirl about the outside of the turbine nozzle cartridge assembly 74 within the cavity 20", and then flow with swirl into the peripheral inlet 93 of the turbine nozzle cartridge assembly 74 along the vanes 80 thereof, and against the turbine blades 92 of the turbine rotor 30, thereby driving the turbine rotor 30 that in turn rotates the rotor shaft 32 and the compressor rotor 56 attached thereto. The exhaust gases 21 then flow through the nozzle exhaust portion 84 of the turbine nozzle cartridge assembly 74 before being exhausted into and through the second exhaust port 94' in the turbocharger exhaust housing 158, and then into the engine exhaust system 98, which, for example, may include one or more exhaust treatment devices 100, for example, one or more catalytic converters or mufflers.

The turbocharger exhaust housing 158 could be constructed of the same type of material, for example cast iron, or alternatively, cast with a relatively-high-nickel-content alloy, as could be used for the exhaust manifold 162. As for the first aspect of an internal combustion engine, the turbocharger core 10 may be tuned to a particular engine by modifying the turbine nozzle cartridge assembly 74, independently of the design of the turbocharger exhaust housing 158 and the associated cavity 20".

Figure 16:
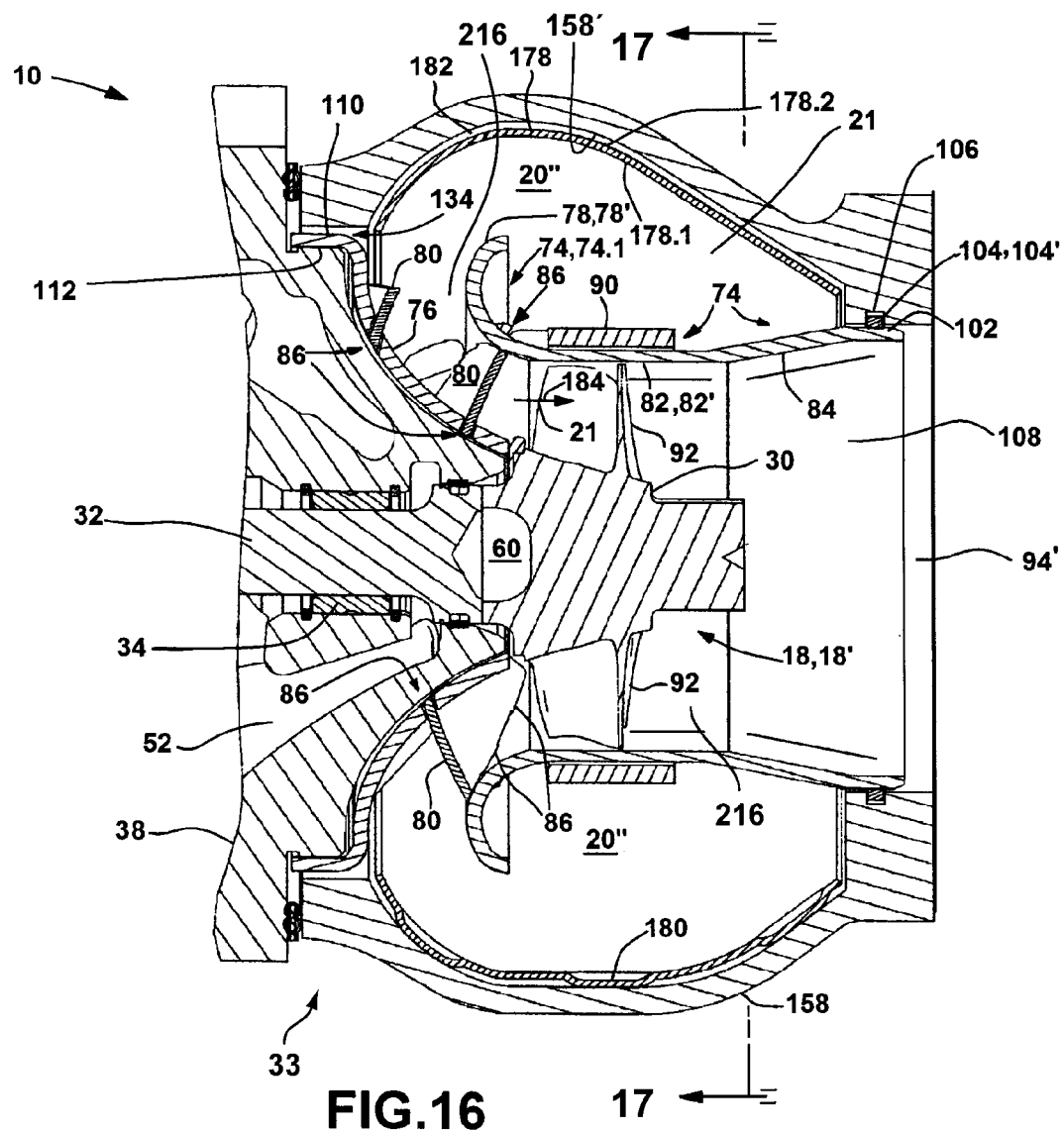
FIG. 16 illustrates a fragmentary longitudinal cross-sectional view of a second embodiment of the first aspect of a turbocharger assembly in accordance with the second aspect an internal combustion engine.
Figure 17:
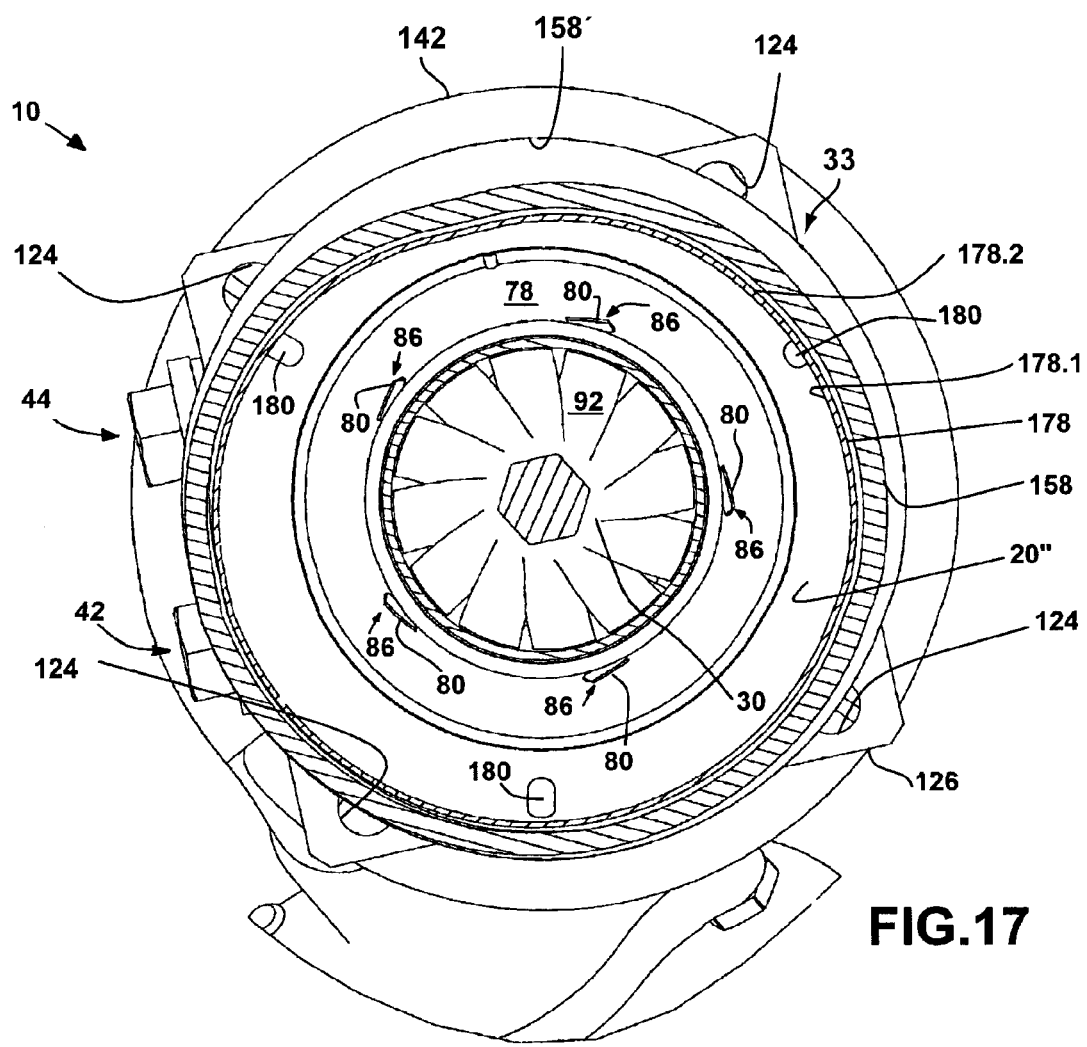
FIG. 17 illustrates a transverse cross-sectional view of the second embodiment of the first aspect of the turbocharger assembly illustrated in FIG. 16.

Referring to FIGS. 16 and 17, in accordance with a second embodiment of an associated first aspect of a turbocharger assembly 200.1" adapted for use with the second aspect of an internal combustion engine 14, 14.2, the associated turbocharger exhaust housing 158 incorporates an internal heat shield 178, for example, constructed from a sheet-metal material that can withstand high temperature exhaust gases 21, for example, of a nickel alloy, for example, stainless steel with a relatively high nickel content, for example, 310 stainless steel, that provides for high temperature oxidation resistance and strength. Exhaust gases 21 within the turbocharger exhaust housing 158 are substantially contained within the inside surface 178.1 of the internal heat shield 178, the latter of which incorporates a plurality externally-protruding dimples 180 that provide for separating the outside surface 178.2 of the internal heat shield 178 from the inside surface 158' of the turbocharger exhaust housing 158 with an associated air gap 182 that provides for reducing conductive heat transfer from the internal heat shield 178 to the turbocharger exhaust housing 158. Accordingly, the internal heat shield 178 provides for both radiative and conductive heat shielding.

Although the internal heat shield 178 is illustrated in the context of a second aspect of the internal combustion engine 14, 14.2, i.e. external of an associated cylinder head assembly 12, an internal heat shield 178 can be particularly beneficial in the context of the first aspect the internal combustion engine 14, 14.1, i.e. integrated with an associated cylinder head assembly 12, so as to provide for substantially reducing the amount of heat transferred from the exhaust gases 21 to the cylinder head assembly 12 that would otherwise need to be removed by the associated water cooling system 46 of the internal combustion engine 14, 14.1. For example, in one simulated embodiment of the first aspect of the internal combustion engine 14, 14.1 with an associated aluminum cylinder head assembly 12 incorporating a cavity 20 having a 6 mm wall thickness and lined with a 1.5 mm thick internal heat shield 178 in cooperation with an associated turbocharger core 10, for exhaust gases 21 at 1050 degrees Celsius, the associated heat transfer was reduced from 8.20 kilowatts to 1.80 kilowatts, and the associated heat transfer coefficient was reduced from about 9 Watts per degree Kelvin to about 2 Watts per degree Kelvin, with the internal heat shield 178 operating at about 904 degrees Celsius.

The turbocharger core 10 has been illustrated hereinabove configured with an axial-flow turbine 18', wherein the exhaust gases 21 discharged from a nozzle portion 74.1 of the turbine nozzle cartridge assembly 74 are directed in a substantially axial-aftwards direction 184 aftward onto and against the turbine blades 92 of the associated axial-flow turbine 18' located aftward of the forward nozzle wall 76, vanes 80, and nozzle portion 74.1 of the turbine nozzle cartridge assembly 74.

Figure 18:
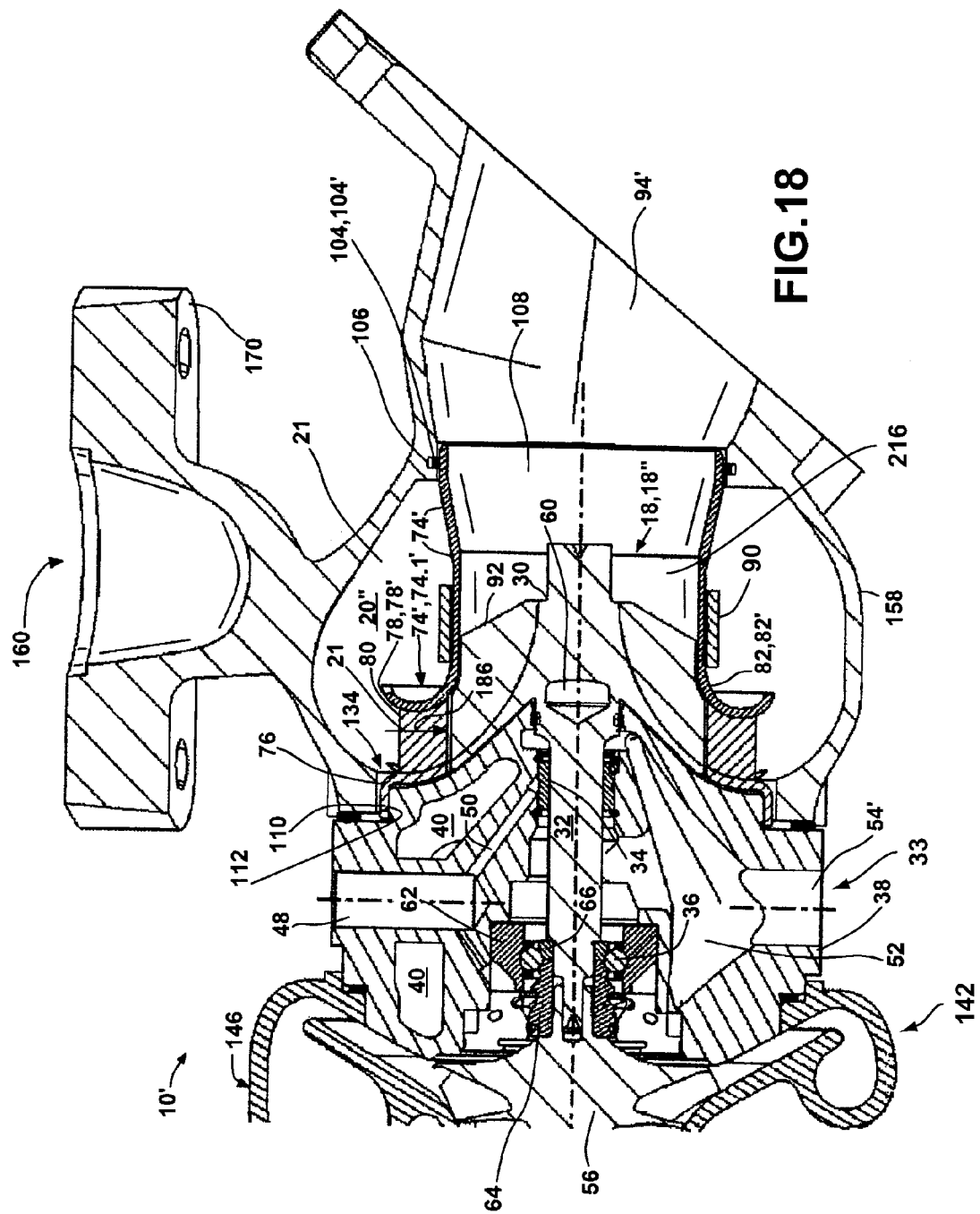
FIG. 18 illustrates a third embodiment of the first aspect of a turbocharger assembly incorporating a second aspect of an associated turbocharger core having an associated radial-flow turbine, in accordance with the second aspect of an internal combustion engine.
Figure 19:
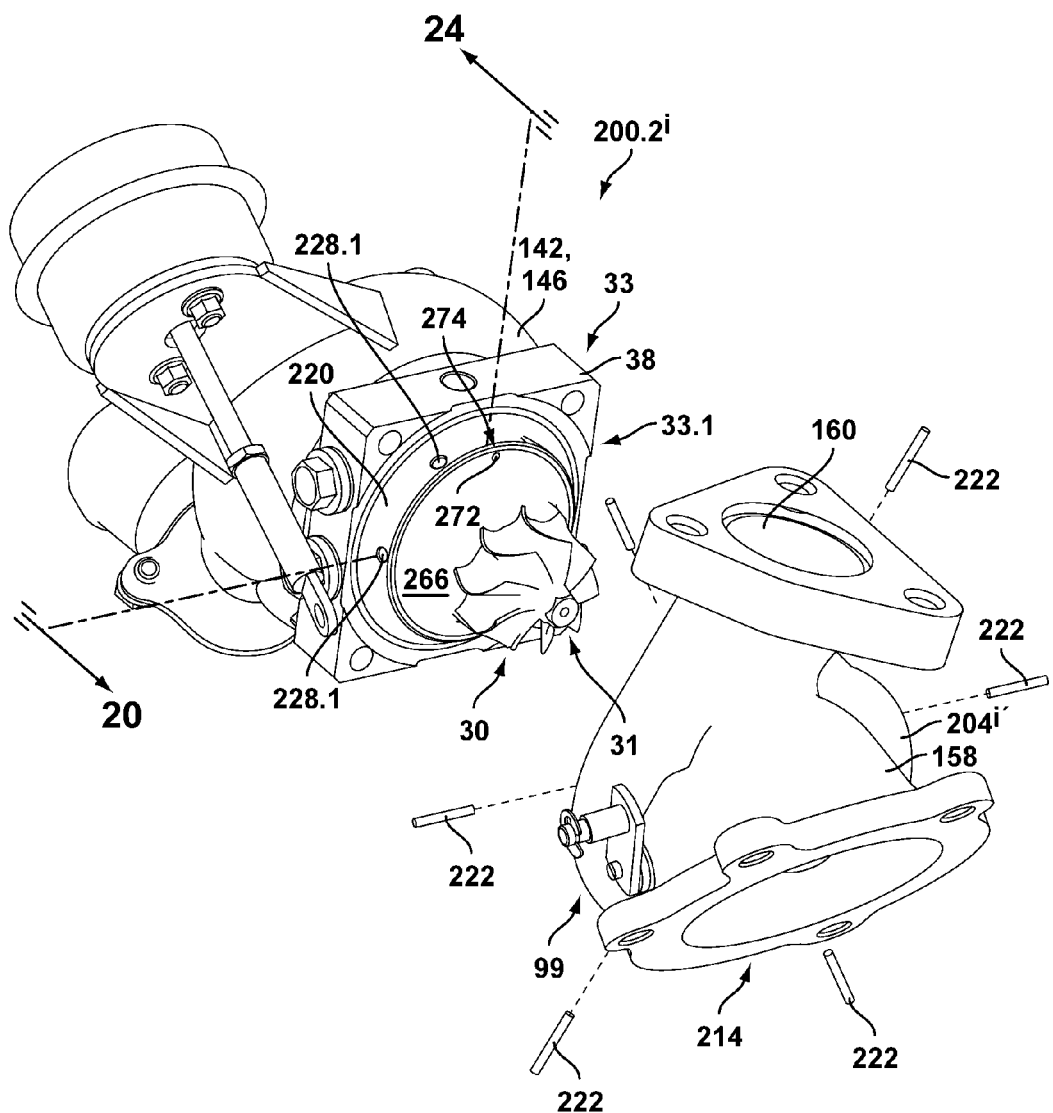
FIG. 19 illustrates an isometric partially exploded view of a first embodiment of a second aspect of a turbocharger assembly useable with the second aspect an internal combustion engine, illustrating a first embodiment of associated radial pins that provide for coupling the associated exhaust housing to the associated centerbody, and that provide for maintaining a concentricity the exhaust housing relative to the centerbody of the turbocharger assembly.

Alternatively, referring to FIG. 18, a third embodiment of the first aspect of a turbocharger assembly 200.1''' adapted in accordance with the second aspect of an internal combustion engine is illustrated incorporating a second aspect of an associated turbocharger core 10' having an associated radial-flow turbine 18'' and a corresponding associated turbine nozzle cartridge assembly 74' that provides for discharging the associated exhaust gases 21 in a substantially radial-inwards direction 186 from the nozzle portion 74.1' of the turbine nozzle cartridge assembly 74 onto and against the turbine blades 92' of the associated radial-flow turbine 18'' located radially inboard of the forward nozzle wall 76, vanes 80, and nozzle portion 74.1' of the turbine nozzle cartridge assembly 74'.

Furthermore, alternatively, the turbocharger core 10 may be adapted with a mixed-flow turbine, i.e. a combined radial-flow and axial-flow turbine, with an associated turbine nozzle cartridge assembly 74 adapted to cooperate therewith, but otherwise generally configured as described hereinabove, with the associated mixed-flow turbine rotor located aft and radially inboard of the forward nozzle wall 76, vanes 80, and nozzle portion 74.1 of the turbine nozzle cartridge assembly 74, with an associated conical boundary therebetween.

Furthermore, it should be understood that either the first or second aspects of the associated internal combustion engine 14, 14.1, 14.2 described hereinabove may be adapted to provide for a wastegate valve 99 to provide for bypassing exhaust gases 21 from the internal combustion engine 14, 14.1, 14.2 around the turbocharger core 10, i.e. to as to enable some or all of the exhaust gases 21 to flow from the exhaust runners 24 or exhaust manifold 162 to the engine exhaust system 98 without flowing through the turbine 18.

The turbine nozzle cartridge assembly 74 provides for readily matching or tuning the turbocharger core 10 to a particular internal combustion engine 14, 14.1, 14.2, because other components of the turbocharger core 10—particularly the associated exhaust housing portion 88 of the cylinder head assembly 12 or the associated turbocharger exhaust housing 158—would not typically need to be modified during that process. Furthermore, with the turbine nozzle cartridge assembly 74 separate from and free to float relative to the associated exhaust housing portion 88 of the cylinder head assembly 12 or the associated turbocharger exhaust housing 158, production versions of the turbocharger core 10 can be adapted to work with relatively smaller clearances between the turbine tip shroud 82' and the tips 120 of the turbine blades 92 without danger of interference therebetween during the operation of the turbocharger core 10 over the life thereof.

Referring to FIGS. 19-22, a first embodiment of an associated second aspect, a turbocharger assembly $200.2^i$ usable in cooperation with a second aspect of an internal combustion engine 14, 14.2 comprises a centerbody 33, a compressor 16 and a turbine 18.

The centerbody 33 comprises a bearing housing 38, at least one bearing 34, 36 within and operatively coupled to the bearing housing 38, and a rotor shaft 32 rotationally supported by the at least one bearing 34. 36 spaced therealong, wherein the rotor shaft 32 is part of an associated turbocharger rotor assembly 31.

The compressor 16 of the turbocharger core 10 comprises a compressor rotor 56—also part of the turbocharger rotor assembly 31—within an associated compressor housing 142 that is operatively coupled to a forward side 33.2 of the centerbody 33. The compressor rotor 56 is operatively coupled to the forward end 32.2 of the rotor shaft 32 and adapted to rotate therewith about an axis of rotation 202' of the turbocharger rotor assembly 31.

The turbine 18 comprises a turbine rotor 30—also part of the turbocharger rotor assembly 31—within an associated turbocharger exhaust housing 158 that is operatively coupled to an aft side 33.1 of the centerbody 33. The turbine rotor 30 is operatively coupled to—for example, welded to—the aft end 32.1 of the rotor shaft 32 along the periphery of a cavity 60 between the forward end of the turbine rotor 30 and the aft end 32.1 of the rotor shaft 32 that provides for reducing heat transfer from the turbine rotor 30 to the rotor shaft 32. An inlet 160 of the turbocharger exhaust housing 158 provides for operatively coupling to, and receiving exhaust gases 21 from, an exhaust manifold 162 of an internal combustion engine 14, 14.2. For example, as illustrated in FIG. 13, the inlet 160 of the turbocharger exhaust housing 158 is operatively coupled to the exhaust manifold 162 with a plurality of bolts 164 through a first flange 166 at the outlet 168 of the exhaust manifold 162 into a second flange 170 at the inlet 160 of the turbocharger exhaust housing 158. The inlet 160 is in fluid communication with a first aspect of a volute $204^i$ in a first aspect of a volute portion $204^{i'}$ of the turbocharger exhaust housing 158 that provides for discharging exhaust gases 21 onto the turbine rotor 30. At least a portion of an aft boundary $206^i$ of the volute portion $204^{i'}$ comprises a surface of revolution $206^{i'}$ about the axis of rotation 202' of the turbine rotor 30. The aft boundary $206^i$ is located further from the centerbody 33 than a corresponding opposing forward boundary $207^i$ of the volute portion $204^{i'}$. For example, in one embodiment the surface of revolution $206^{i'}$ comprises a planar surface $206^{i''}$ that is substantially perpendicular to the axis of rotation 202'. The exhaust gases 21 are discharged from the outlet 208 of the volute $204^i$ onto the turbine rotor 30 so as to provide for driving the turbine rotor 30, which in turn drives the associated turbocharger rotor assembly 31.

A portion of the turbine rotor 30 is concentrically surrounded by a shroud portion 210 of the turbocharger exhaust housing 158, wherein the radius of the shroud portion 210 of the turbocharger exhaust housing 158 exceeds that of the corresponding radius of the turbine rotor 30 by a corresponding tip clearance 212. The efficiency of the turbine 18 is generally improved with decreasing tip clearance 212 as a result of a corresponding associated reduction in exhaust gases 21 bypassing the turbine blades 92, 92' through the annular region between the tips 120 of the turbine blades 92, 92' and the shroud portion 210 of the turbocharger exhaust housing 158. Upon discharge from the turbine rotor 30, the exhaust gases 21 are then discharged through an exhaust outlet 214 at an aft end 158.1 of the turbocharger exhaust housing 158 and into the associated engine exhaust system 98. Accordingly, the turbocharger exhaust housing 158 comprises a corresponding fluid conduit 216 between the inlet 160 and the outlet 208 thereof, through which the exhaust gases 21 flow, and within which the associated turbine rotor 30 operates.

A forward end 158.2 of the turbocharger exhaust housing 158 incorporates an internal cylindrical surface 218 that mates with a corresponding external cylindrical surface 220 on the aft side 33.1 of the centerbody 33. An axis 202" of the external cylindrical surface 220 is substantially concentric with an axis of rotation 202' of the turbine rotor 30 and with an axis 202 of the internal cylindrical surface 218.

Figure 22:
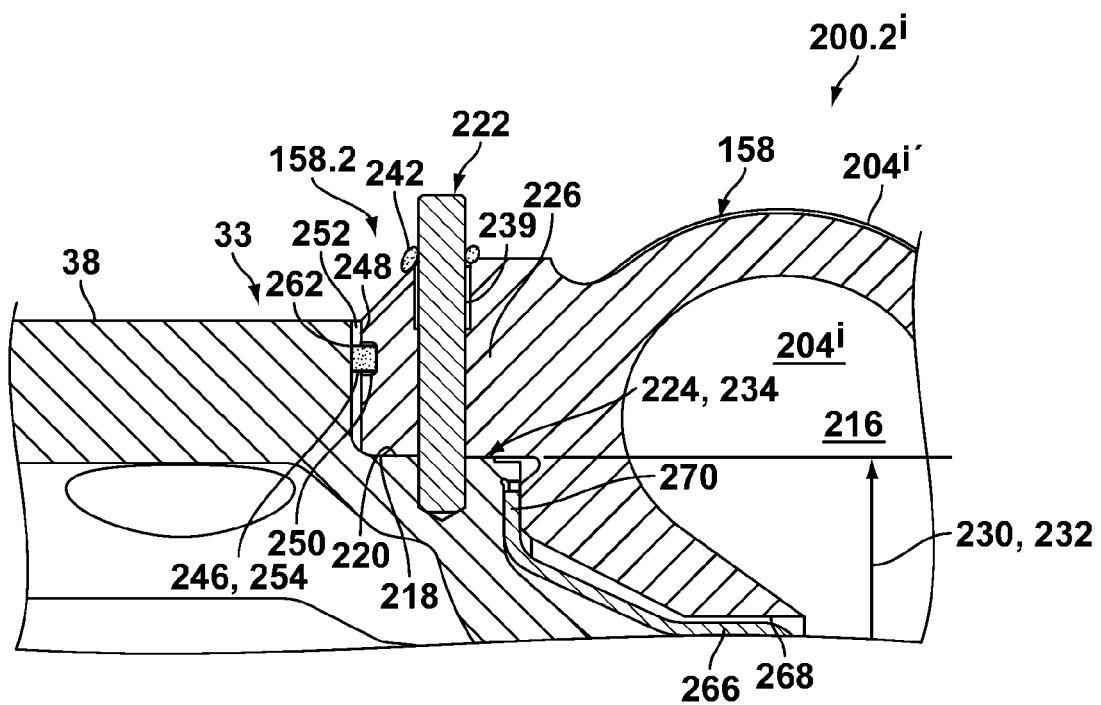
FIG. 22 illustrates a fragmentary longitudinal cross-section of the first embodiment of the second aspect of a turbocharger assembly illustrated in FIGS. 19-21, illustrating a first embodiment of an associated seal between the centerbody and exhaust housing of the turbocharger assembly.

The turbocharger exhaust housing 158 is operatively coupled to the centerbody 33 with a plurality of radial pins 222, each of which extends radially across a junction 224 between the internal 218 and external 220 cylindrical surfaces and engages both the centerbody 33 and a wall 226 of the turbocharger exhaust housing 158 so as to prevent more than insubstantial relative axial movement therebetween. Each radial pin 222 is slideably engaged with at least one of a corresponding radial bore 228 in the turbocharger exhaust housing 158 and a corresponding radial bore 228 in the centerbody 33 so that the internal cylindrical surface 218 is free to thermally expand radially relative to the external cylindrical surface 220. The radial bore 228 in the turbocharger exhaust housing 158 is closed to the fluid conduit 216. The plurality of radial pins 222 are arranged around the centerbody 33 so as to provide for the internal 218 and external 220 cylindrical surfaces to remain substantially concentric regardless of a thermal expansion of the turbocharger exhaust housing 158 relative to the centerbody 33, and so as to provide for the shroud portion 210 of the turbocharger exhaust housing 158 to remain substantially concentric regardless of a thermal expansion of the turbocharger exhaust housing 158 relative to the turbine rotor 30. For example, as illustrated in FIG. 22, for one set of embodiment, the diameter 230 of the internal cylindrical surface 218 is less than the diameter 232 of the external cylindrical surface 220 at room temperature so as to provide for an interference fit therebetween in a non-operative state of the turbocharger assembly 200.2$^i$. By incorporating the plurality of radial pins 222 in cooperation with the corresponding plurality of radial bores 228 to provide for a radial thermal expansion of the turbocharger exhaust housing 158 relative to the centerbody 33 that is substantially without constraint other than as to the maintenance of concentricity of the internal 218 and external 220 cylindrical surfaces, the second aspect of the turbocharger assembly 200.2 provides for configuring the diameter of the shroud portion 210 of the turbocharger exhaust housing 158 in relation to that of the turbine rotor 30 so to provide for an associated tip clearance 212 at room temperature that is less than 4 percent of the radius of the turbine rotor 30 at the aft portion thereof.

Figure 21:
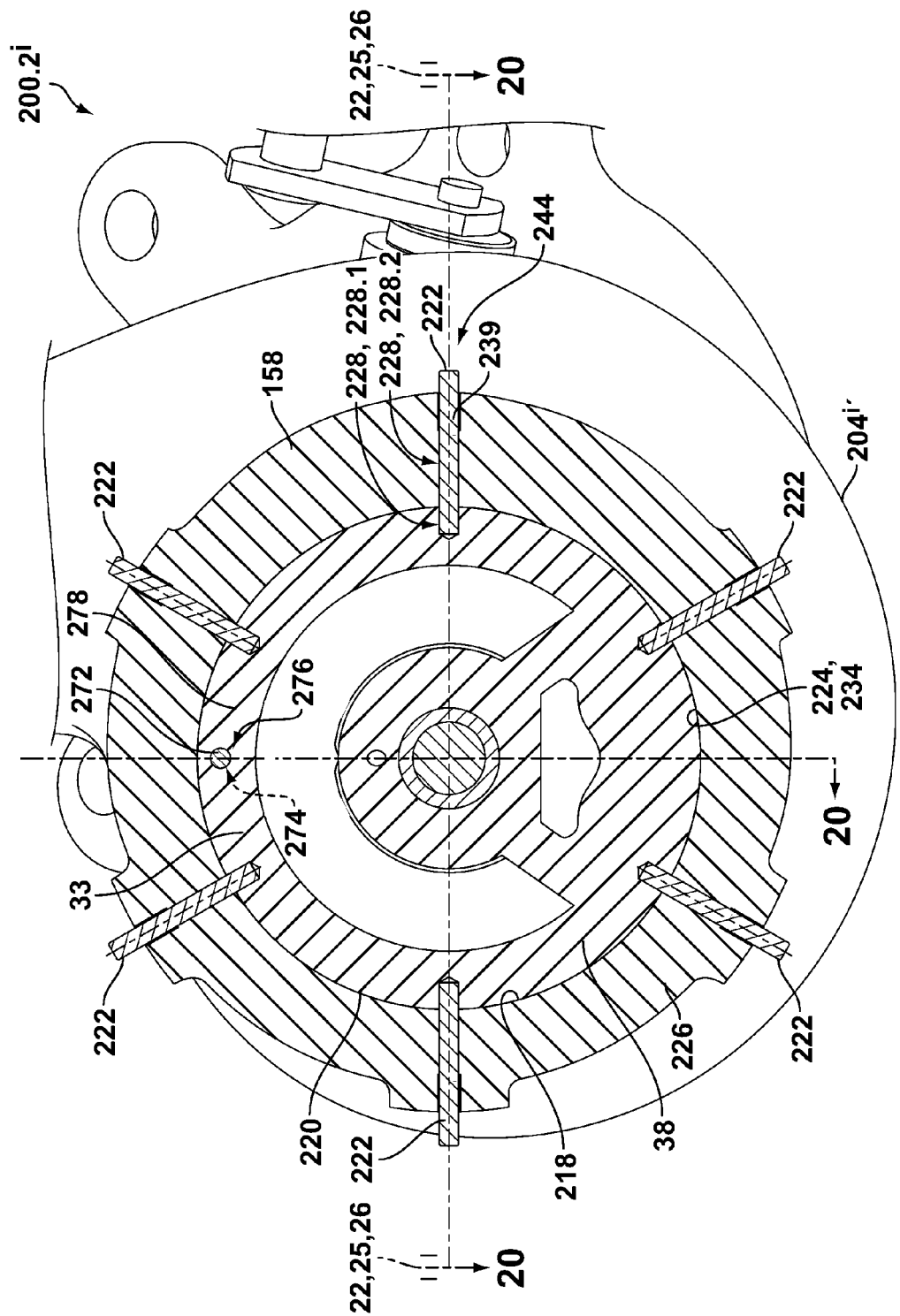
FIG. 21 illustrates an aft-looking radial cross-section of the first embodiment of the second aspect of a turbocharger assembly illustrated in FIGS. 19 and 20 through a transverse plane intersecting the centers of a plurality of associated radial pins.

For example, the plurality of radial pins 222 may be either symmetrically located or equi-spaced—or both—around the junction 224 between the centerbody 33 and around the associated turbocharger exhaust housing 158. For example, FIG. 21 illustrates a plurality of six radial pins 222 that are equi-spaced from one another and are in a symmetrical arrangement with respect to one another. Generally, the plurality of radial pins 222 would comprise at least three radial pins 222.

Figure 23A:
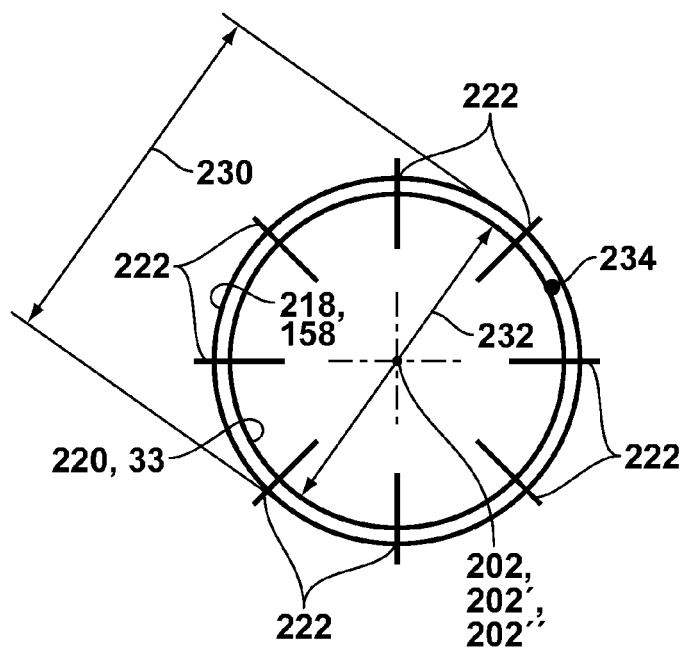
FIGS. 23a and 23b schematically illustrate a thermal expansion of an internal cylindrical surface of an exhaust housing relative to an external cylindrical surface of a centerbody, illustrating the plurality of associate radial pins maintaining the relative concentricity of the internal and external cylindrical surfaces for two different conditions of relative thermal expansion.
Figure 23B:
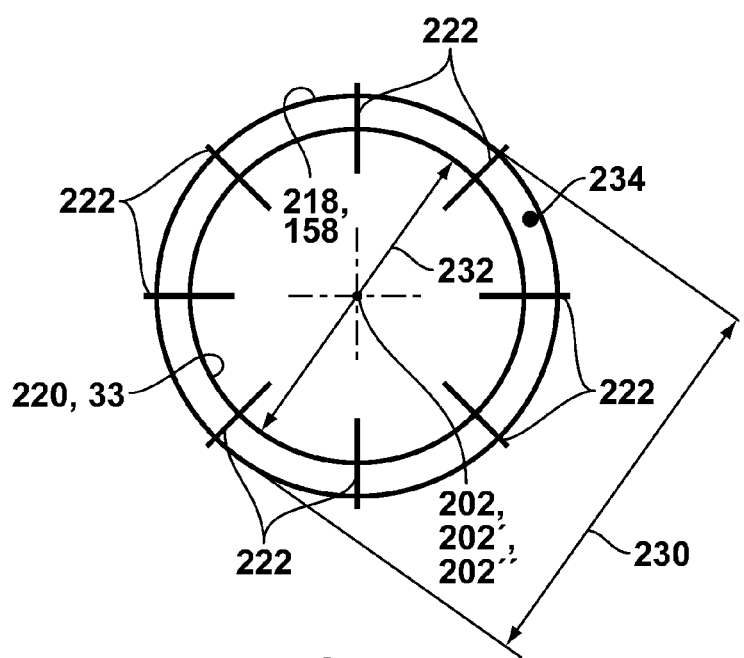

In operation of the turbocharger assembly 200.2$^i$, exhaust gases 21 from the exhaust manifold 162 flow into the inlet 160 of the turbocharger exhaust housing 158, through the associated volute 204$^i$, and then discharge from the outlet 208 thereof onto the turbine blades 92, 92' of the turbine rotor 30, thereby driving the turbine rotor 30 that in turn rotates the rotor shaft 32 and the compressor rotor 56 attached thereto. The exhaust gases 21 then flow through the shroud portion 210 of the turbocharger exhaust housing 158 before being exhausted through the associated exhaust outlet 214, and then into the engine exhaust system 98, which, for example, may include one or more exhaust treatment devices 100, for example, one or more catalytic converters or mufflers. The turbocharger exhaust housing 158 could be constructed of the same type of material, for example cast iron, or alternatively, cast with a relatively-high-nickel-content alloy, as could be used for the exhaust manifold 162 of the internal combustion engine 14, 14.2. The exhaust gases 21 heat the turbocharger exhaust housing 158 upon flowing through the associated fluid conduit 216 thereof, thereby causing the turbocharger exhaust housing 158 to thermally expand relative to the centerbody 33, thereby causing a gap 234 between the internal 218 and external 220 cylindrical surfaces, the latter of which remain substantially concentric as a result of the constraining action of the radial pins 222 spaced around the junction 224 therebetween, which slide within the corresponding associated radial bores 228, as illustrated in FIGS. 23a and 23b for relatively less thermal expansion and relatively more thermal expansion, respectively.

For example, in accordance with the first embodiment of an associated second aspect of the turbocharger assembly 200.2$^i$ illustrated in FIGS. 19-22, each radial pin 222 is slideably engaged with both a first radial bore 228.1 in the centerbody 33, and a second radial bore 228.2 in the wall 226 of the turbocharger exhaust housing 158, so that each radial pin 222 can slide relative to either or both the first 228.1 or second 228.2 radial bores responsive to a thermal expansion of the turbocharger exhaust housing 158 relative to the centerbody 33. Alternatively, for at least one or all of the radial pins 222, the radial pin 222 could be radially restrained in one of the centerbody 33 and wall 226 of the turbocharger exhaust housing 158, but slideably engaged with a corresponding radial bore 228 in the other of the centerbody 33 and wall 226 of the turbocharger exhaust housing 158. For example, alternatively, the radial pin 222 could be installed with an interference fit in the first radial bore 228.1 in the centerbody 33, but slideably engaged in the second radial bore 228.2 in the wall 226 of the turbocharger exhaust housing 158, or the radial pin 222 could be installed with an interference fit in the second radial bore 228.2 in the wall 226 of the turbocharger exhaust housing 158, but slideably engaged in the first radial bore 228.1 in the centerbody 33, so as to provide for retaining the radial pin 222 in the turbocharger assembly 200.2$^i$.

Figure 24:
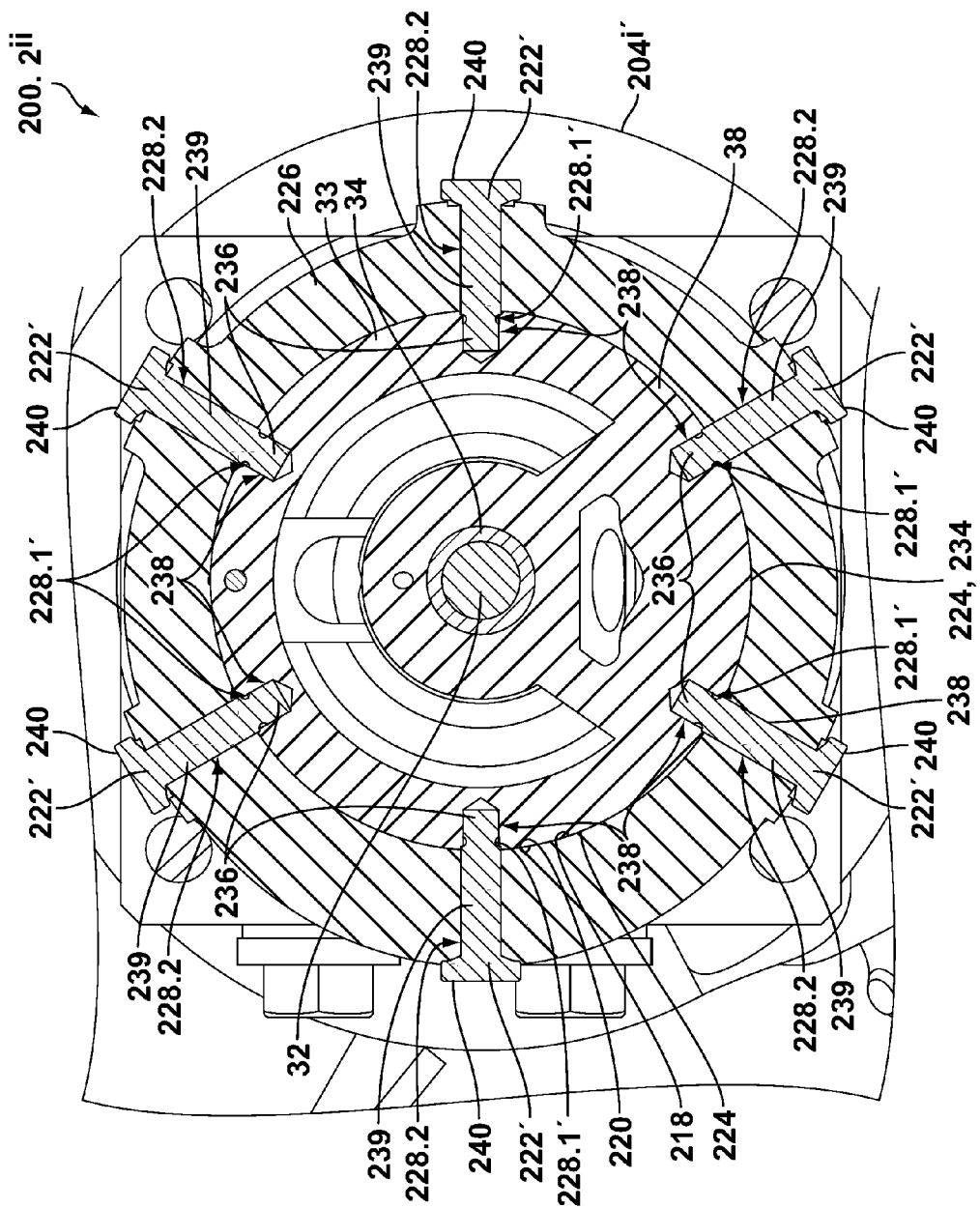
FIG. 24 illustrates a forward-looking radial cross-section of a second embodiment of the second aspect of a turbocharger assembly similar to that illustrated in FIG. 19, through a transverse plane intersecting the centers of a plurality of associated radial pins, for a second embodiment of the radial pins.

Yet further alternatively, referring to FIG. 24, in accordance with a second embodiment of the second aspect of a turbocharger assembly 200.2$^{ii}$ that incorporates a second embodiment of associated radial pins 222', each radial pins 222' incorporates a threaded end portion 236 that engages a corresponding internal thread 238 in the centerbody 33 extending radially inwards from a corresponding radial counterbore 228.1' in the centerbody 33, the latter of which engages the body 239 of the radial pin 222' so as to provide for rotationally aligning the radial counterbores 228.1' in the centerbody 33 with the corresponding second radial bores 228.2 in the wall 226 of the turbocharger exhaust housing 158, which in cooperation with the radial pins 222' provides for substantially centering the internal 218 and external 220 cylindrical surfaces with respect to one another, while the radial pin 222' is retained to the centerbody 33 by engagement of the threaded end portion 236 with the internal thread 238 in the centerbody 33, wherein the head portions 240 of the radial pins 222' are adapted to provide for installing the radial pins 222' during assembly of the turbocharger assembly 200.2$^{ii}$.

Alternatively, one or more radial pins 222 could be threaded near the corresponding head portion 240 so as to provide for engaging a corresponding threaded, counterbored portion radially outwards of a corresponding second radial bore 228.2 in the wall 226 of the turbocharger exhaust housing 158, wherein the body 239 of the radial pin 222 then is slideably engaged with the first 228.1 and second 228.2 radial bores for purposes of assembly, and slideably engaged with the first radial bore 228.1 in the centerbody 33 during operation of the turbocharger assembly 200.2$^{ii}$ so as to provide for substantially centering the internal 218 and external 220 cylindrical surfaces with respect to one another regardless of thermal expansion of the turbocharger exhaust housing 158 relative to the centerbody 33.

In accordance with the first embodiment of the associated second aspect of the turbocharger assembly 200.2$^{i}$ illustrated in FIGS. 19-22, each radial pin 222 is slideably engaged with both the first 228.1 and second 228.2 radial bores at least during assembly, but is retained to the turbocharger assembly 200.2$^{i}$ either by a weld 242 to the turbocharger exhaust housing 158, or by staking a radially outboard portion 244 of the second radial bore 228.2 in the wall 226 of the turbocharger exhaust housing 158, either with the radial pin 222 extending therethrough as illustrated, or, alternatively, with a relatively shorter radial pin 222 that is inserted radially within the radially outboard portion 244.

Figure 20:
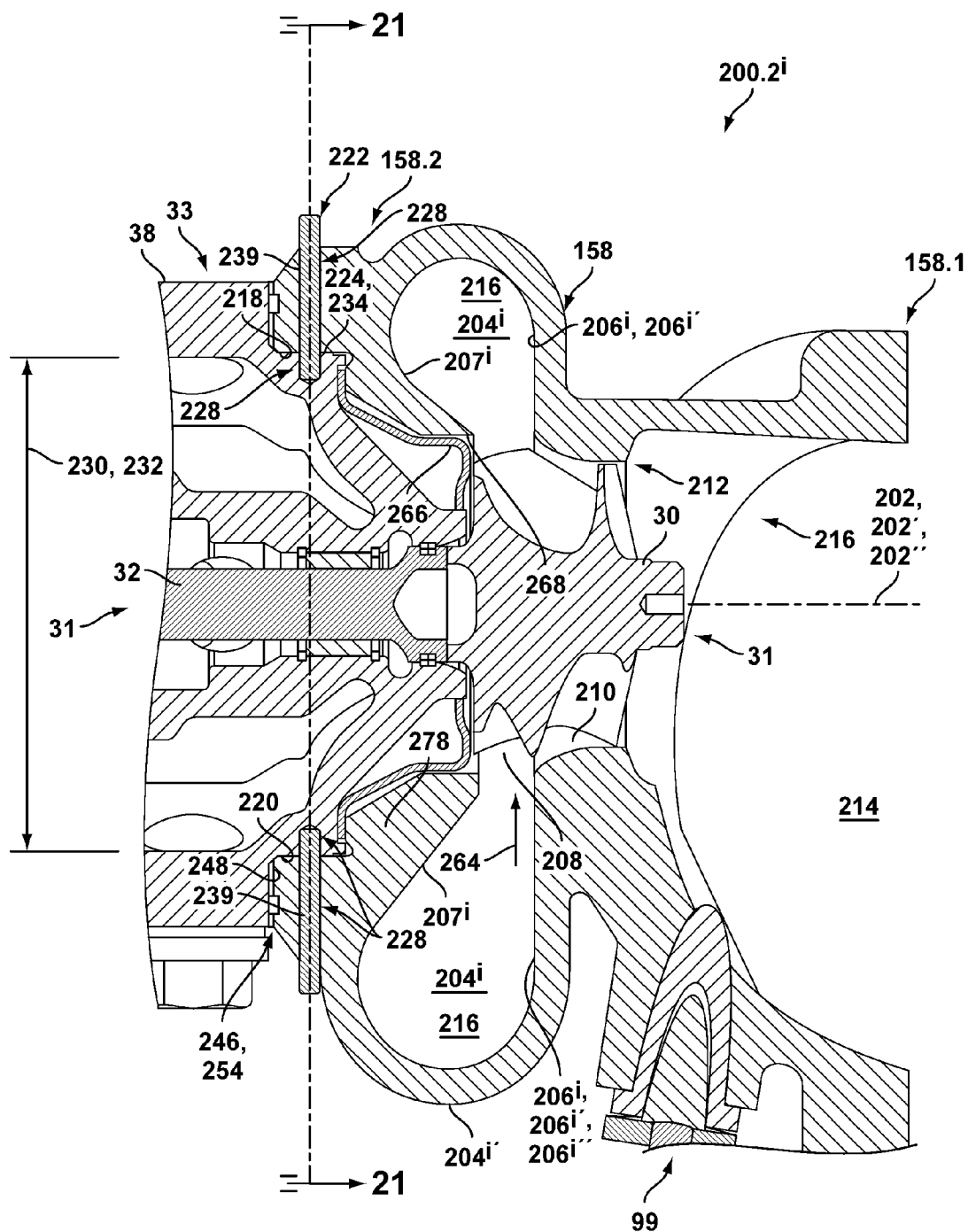
FIG. 20 illustrates a portion of a longitudinal cross-section of the first embodiment of a second aspect of a turbocharger assembly illustrated in FIG. 19, illustrating a corresponding turbine portion in relation to the corresponding centerbody portion.
Figure 25:
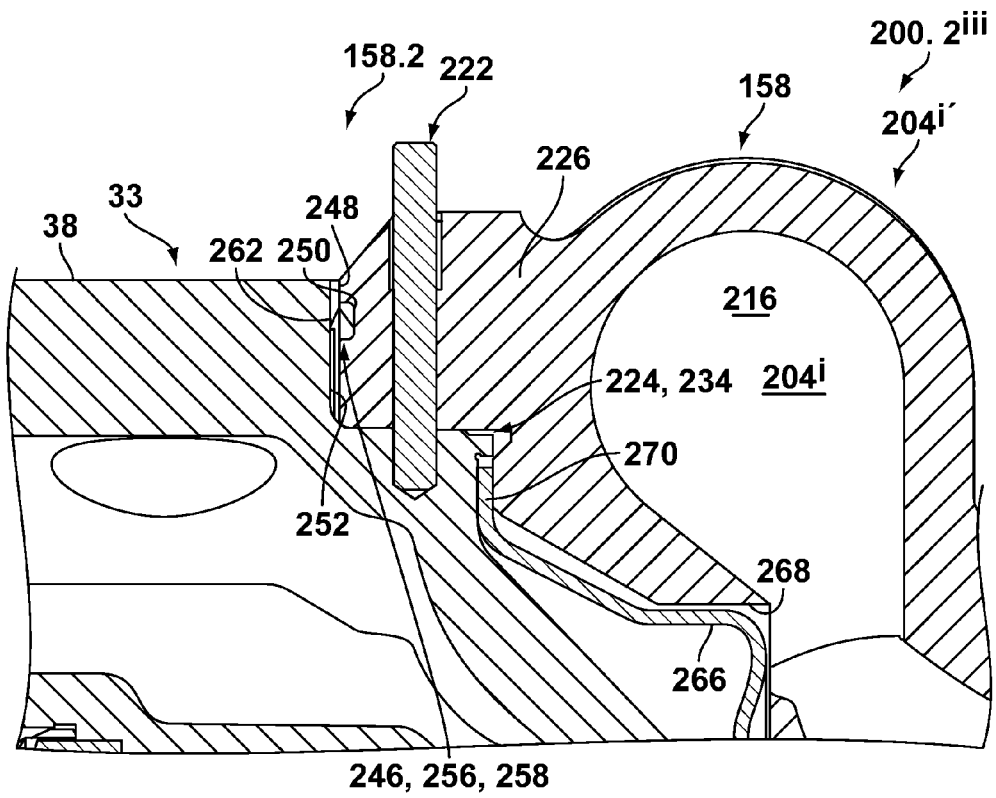
FIG. 25 illustrates a fragmentary longitudinal cross-section of a third embodiment of the second aspect of a turbocharger assembly similar to that illustrated in FIG. 19, illustrating a second embodiment of the associated seal between the centerbody and exhaust housing of the turbocharger assembly.
Figure 26:
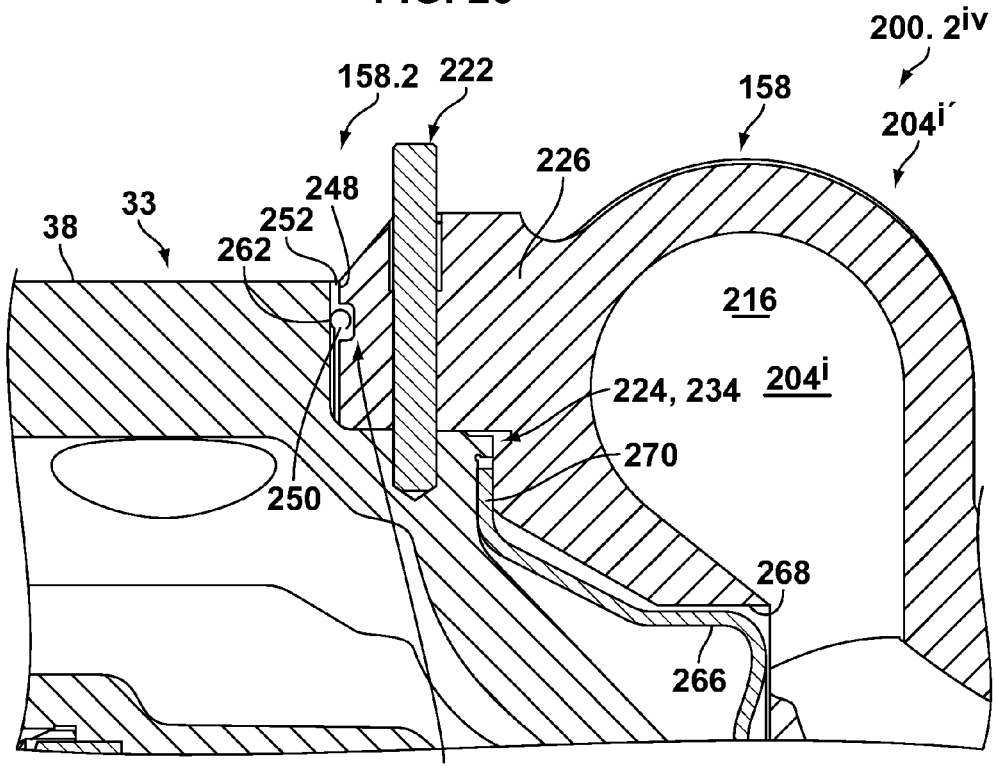
FIG. 26 illustrates a fragmentary longitudinal cross-section of a fourth embodiment of the second aspect of a turbocharger assembly similar to that illustrated in FIG. 19, illustrating a third embodiment of the associated seal between the centerbody and exhaust housing of the turbocharger assembly.

The first embodiment of the associated second aspect of the turbocharger assembly 200.2$^{i}$ further incorporates a seal 246 operative between the centerbody 33 and an end face 248 of the turbocharger exhaust housing 158—for example, optionally operative within a groove 250 in the end face 248 of the turbocharger exhaust housing 158—that provides for preventing the exhaust gases 21 from escaping the turbocharger exhaust housing 158 from gaps 234, 252 between the turbocharger exhaust housing 158 and the centerbody 33, wherein the seal 246 is configured so as to provide for accommodating thermal expansion or contraction of the turbocharger exhaust housing 158 relative to the centerbody 33. For example, the seal 246 may comprise either a thermal gasket 254—for example, as illustrated in FIGS. 20 and 22 for the first embodiment of the associated second aspect of the turbocharger assembly 200.2$^{i}$, or a metallic seal 256, for example, comprising a radial cross-section selected from the group consisting of a V-shaped cross-section 258 and a first aspect of a C-shaped cross-section 260', for example, as illustrated in FIGS. 25 and 26, respectively for the third and fourth embodiments of the associated second aspect of the turbocharger assembly 200.2$^{iii}$, 200.2$^{iv}$, respectively, wherein the associated seals 246 are operative across an axial gap 252. In one set of embodiments, for example, as illustrated in FIGS. 20, 22, 25 and 26, the external cylindrical surface 220 is stepped into a corresponding side 33.1 of the centerbody 33, and the seal 246 is operative between the end face 248 and a radial surface 262 extending radially outwards from the external cylindrical surface 220 stepped into the corresponding side 33.1 of the centerbody 33, wherein the V-shaped cross-section 258 and the first aspect of the C-shaped cross-section 260' metallic seals 256 have associated sealing surfaces and are oriented so that these sealing surfaces are axially spring-biased respectively against the associated radial surface 262 of the centerbody 33 and the associated end face 248 of the turbocharger exhaust housing 158 so as to provide for sealing the gap 252 therebetween while also providing for a radial movement of the end face 248 relative to the radial surface 262 responsive to a thermal expansion or contraction of the of the turbocharger exhaust housing 158 relative to the centerbody 33.

Figure 27:
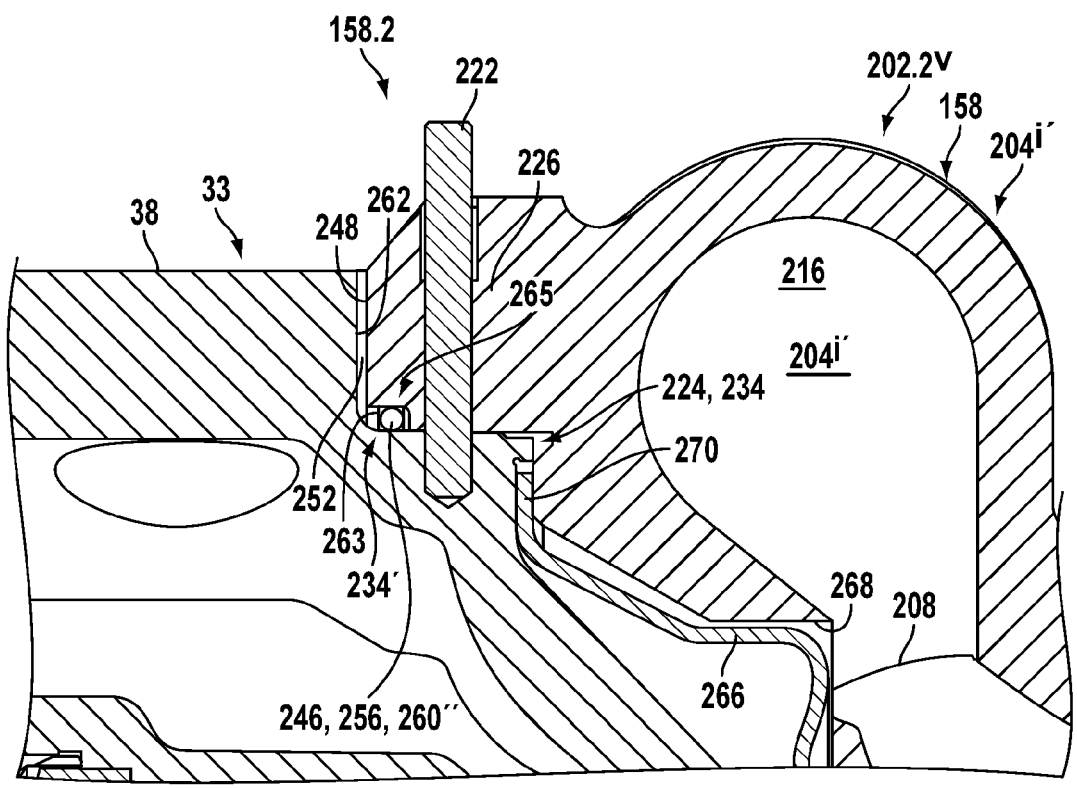
FIG. 27 illustrates a fragmentary longitudinal cross-section of a fifth embodiment of the second aspect of a turbocharger assembly similar to that illustrated in FIG. 19, illustrating a fourth embodiment of the associated seal between the centerbody and exhaust housing of the turbocharger assembly.

Referring to FIG. 27 a fifth embodiment of the second aspect of a turbocharger assembly 200.2$^{v}$ the seal 246 is operative across a radial gap 234 between the centerbody 33 and the turbocharger exhaust housing 158, for example, by incorporating a metallic seal 256 incorporating a second aspect of a C-shaped cross-section 260" that is oriented so that the associated sealing surfaces are radially spring-biased respectively against an the external cylindrical surface 220 of the centerbody 33 and an associated internal cylindrical surface 263 of an associated counterbore 265 at the forward end 158.2 of the turbocharger exhaust housing 158 so as to provide for sealing the associated radial gap 234' therebetween regardless of a radial movement of the end face 248 relative to the radial surface 262 responsive to a thermal expansion or contraction of the of the turbocharger exhaust housing 158 relative to the centerbody 33.

In accordance with one set of embodiments, the plurality of radial bores 228 are match-drilled through the wall 226 and internal cylindrical surface 218 of the turbocharger exhaust housing 158, through the external cylindrical surface 220 of the centerbody 33, and into the centerbody 33 after fully sliding the internal cylindrical surface 218 of the turbocharger exhaust housing 158 onto the external cylindrical surface 220 of the centerbody 33 with sufficient force to compress the seal 246 sufficiently enough to provide for sealing the end face 248 of the turbocharger exhaust housing 158 against the corresponding radial surface 262 of the centerbody 33 under all subsequent anticipated operating conditions for the design life of the turbocharger assembly 200.2.

Referring to FIG. 20, the use of the plurality of radial pins 222 in cooperation with the corresponding plurality of associated radial bores 228 to operatively couple the turbocharger exhaust housing 158 to the centerbody 33—for example, rather than a V-clamp as might be used in a conventional turbocharger—provides for locating the associated volute 204$^{i}$ forward of an aft boundary 206$^{i}$ of an outlet 208 thereof onto the bladed rotor 30 so as to provide for a direction of flow 264 of the exhaust gases 21 onto the bladed rotor 30 that is either substantially radially inwards or at least partially axially aftward from the centerbody 33 with decreasing distance from the bladed rotor 30.

In another set of embodiments, also illustrated in FIGS. 20 and 21, a heat shield 266 is operative between the centerbody 33 and the turbine rotor 30 within an axial bore 268 in the turbocharger exhaust housing 158, wherein the axial bore 268 has a diameter in excess of a maximum diameter of the turbine rotor 30 so as to provide for assembling the turbocharger exhaust housing 158 over the turbine rotor 30, the latter of which is preassembled as part of the centerbody 33. An outer rim 270 of the heat shield 266 is retained axially between the centerbody 33 and the turbocharger exhaust housing 158, and is keyed to the centerbody 33 with an axial pin 272 extending therefrom through a corresponding axial hole 274 through the outer rim 270 of the heat shield 266—so as to prevent a rotation of the heat shield 266—and, in one embodiment, into an axial bore 276 in a corresponding forward portion 278 of the turbocharger exhaust housing 158 so as to provide for roughly aligning the turbocharger exhaust housing 158 with the centerbody 33 during assembly, wherein the radial clearance around the axial pin 272 within the axial bore 276 in the corresponding forward portion 278 of the turbocharger exhaust housing 158 is sufficient so as to not interfere with a thermal expansion of the internal cylindrical surface 218 of the turbocharger exhaust housing 158 relative to the centerbody 33.

Figure 28:
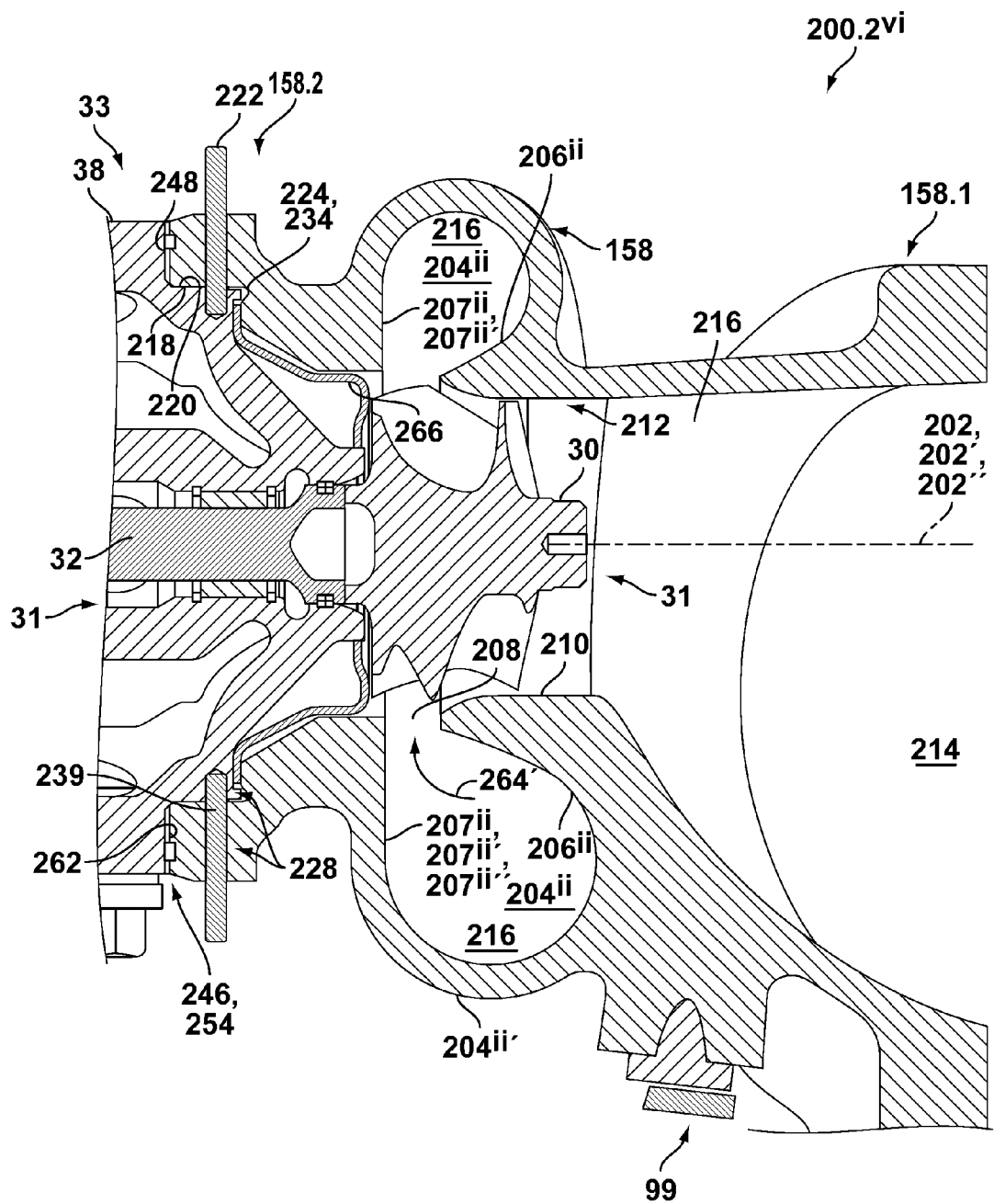
FIG. 28 illustrates a fragmentary longitudinal cross-section of a sixth embodiment of the second aspect of a turbocharger assembly, illustrating a second aspect of an associated volute portion of the exhaust housing of the turbocharger assembly.

Referring to FIG. 28 a sixth embodiment of the second aspect of a turbocharger assembly 200.2$^{vi}$ incorporates a second aspect of a volute 204$^{ii}$ and associated second aspect of the volute portion 204$^{i'}$ of the turbocharger exhaust housing 158—but is otherwise similar to the first aspect of the turbocharger assembly 200.2$^{i}$ described hereinabove—wherein at least a portion of a forward boundary 207$^{ii}$ of the volute portion 204$^{i'}$ comprises a surface of revolution 207$^{ii'}$ about the axis of rotation 202' of the turbine rotor 30. A corresponding opposing aft boundary 206$^{ii}$ is located further from the centerbody 33 than the forward boundary 207$^{ii}$ of the volute portion 204$^{ii'}$. For example, in one embodiment the surface of revolution 207$^{ii'}$ comprises a planar surface 207$^{i'''}$ that is substantially perpendicular to the axis of rotation 202'. The exhaust gases 21 are discharged from the outlet 208 of the volute 204$^{i}$ onto the turbine rotor 30 so as to provide for driving the turbine rotor 30, which in turn drives the associated turbocharger rotor assembly 31.

Although not illustrated in the drawings, it should be understood that the compressor housing 142 of the associated compressor 16 of the turbocharger assembly 200.2 could also be operatively coupled to the centerbody 33 with a plurality of radial pins 222 in cooperation with a corresponding plurality of associated radial bores 228 similarly as described hereinabove for the turbine 18 of the turbocharger assembly 200.2.

Furthermore, it should also be understood that the arrangement of the plurality of radial pins 114, 222 in cooperation with a corresponding plurality of associated radial bores 116, 118, 228 similarly as described hereinabove for the turbine 18 of the turbocharger assembly 200.2 can be used in other types of turbomachines, for example, superchargers, turbines, pumps, or compressors, so as to provide for maintaining the concentricity of an associated fluid-conduit housing 74, 74', 142, 158 with respect to a centerbody 33 so as to provide for provide for maintaining the concentricity of a shroud portion 82, 82', 210 of the fluid-conduit housing 74, 74', 142, 158 with respect to a corresponding bladed rotor 30, 56 regardless of a thermal expansion of the fluid-conduit housing 74, 74', 142, 158 with respect to the centerbody 33, wherein the term fluid is intended to include gases, vapors and liquids, and the associated fluid 21 flows either entirely within the associated fluid-conduit housing 142, 158, or within the fluid-conduit housing 74, 74' that in turn is operative within another fluid-conduit housing 20, 20', 20", 142, 158.

A turbomachine apparatus comprises a centerbody 33, at least one bladed rotor 30, 56 and at least one fluid-conduit housing 74, 74', 142, 158 in cooperation therewith. Although, for purposes of illustration, the reference signs referred to hereinbelow are associated with the turbocharger embodiments illustrated herein, it should be understood that the term turbomachine is not limited to a turbocharger. The centerbody 33 comprises a bearing housing 38, at least one bearing 34, 36 within and operatively coupled to the bearing housing 38; and a rotor shaft 32 rotationally supported by the at least one bearing 34, 36 spaced along the rotor shaft 32. The at least one bladed rotor 30, 56 is operatively coupled to the rotor shaft 32 supported by the centerbody 33. Each bladed rotor 30, 56 is operative within a corresponding fluid conduit 216 defined by the fluid-conduit housing 74, 74', 142, 158. The at least one fluid-conduit housing 74, 74', 142, 158 incorporates an inlet 144, 160 to provide for receiving a corresponding fluid 21 within the fluid conduit 216 that provides for either driving or being driven, pumped or compressed by a corresponding bladed rotor 30, 56 responsive to an interaction of the corresponding fluid 21 with a plurality of blades 92, 92' of the bladed rotor 30, 56. The at least one fluid-conduit housing 74, 74', 142, 158 comprises an internal cylindrical surface 110, 218 at an end 158.2 thereof that mates with a corresponding external cylindrical surface 112, 220 on a corresponding side 33.1 of the centerbody 33. An axis 202" of the external cylindrical surface 112, 220 is substantially concentric with an axis of rotation 202' of the bladed rotor 30, 56 and with an axis 202 of the internal cylindrical surface 110, 218. The fluid-conduit housing 74, 74', 142, 158 is operatively coupled to the centerbody 33 with a plurality of radial pins 114, 222, so that the internal cylindrical surface 110, 218 is free to thermally expand relative to the external cylindrical surface 112, 220, each radial pin 114, 222 of the plurality of radial pins 114, 222 being slideably engaged with at least one of a corresponding radial bore 116, 228, 228.2 in the fluid-conduit housing 74, 74', 142, 158 and a corresponding radial bore 118, 228, 228.1 in the centerbody 33. In one set of embodiments, the radial bore 228, 228.2 in the fluid-conduit housing 142, 158 is closed to the fluid conduit 216. Each the radial pin 114, 222 is oriented radially with respect to both the internal cylindrical surface 110, 218 and the external cylindrical surface 112, 220. The plurality of radial pins 114, 222 are arranged around the centerbody 33 so as to provide for the internal 110, 218 and external 112, 220 cylindrical surfaces to remain substantially concentric regardless of a thermal expansion of the fluid-conduit housing 74, 74', 142, 158 relative to the centerbody 33, and at least a portion of the fluid-conduit housing 74, 74', 142, 158 comprises a shroud portion 82, 82', 210 that substantially concentrically surrounds a portion of the bladed rotor 30, 56.

Regarding the relative size of the internal 110, 218 and external 112, 220 cylindrical surfaces, in one set of embodiments, the internal 110, 218 and external 112, 220 cylindrical surfaces are mated with an interference fit at room temperature.

Regarding the plurality and location of the radial pins 114, 222, the plurality of radial pins 114, 222 are either substantially symmetrically located or substantially equi-spaced—or both—around the centerbody 33 and around the associated fluid-conduit housing 74, 74', 142, 158. In yet another set of embodiments, the plurality of radial pins 114, 222 comprise at least three radial pins 114, 222.

Regarding the operation of the radial pins 114, 222, in one set of embodiments, at least one the radial pin 114, 222 is slideably engaged with both the corresponding radial bore 116, 228, 228.2 in the at least one fluid-conduit housing 74, 74', 142, 158 and the corresponding radial bore 118, 228, 228.1 in the centerbody 33.

In one set of embodiments, the radial pins 114, 222 are retained in cooperation with both the centerbody 33 and the corresponding fluid-conduit housing 74, 74', 142, 158, for example, by either staking or welding 242 to the fluid-conduit housing 142, 158, by an interference fit in the radial bore 228, 228.1, 228.2 in either the fluid-conduit housing 142, 158 or centerbody 33, or by engagement of a screw thread portion 236 of the radial pin 114, 222 with a corresponding screw thread portion in one of the fluid-conduit housing 142, 158 and the centerbody 33.

For example, in one set of embodiments, the at least one bladed rotor 30, 56 comprises at least one of the group selected from a bladed compressor rotor 56 and a turbine rotor 30, for example, the compressor rotor 56 of a compressor 16 portion of a turbocharger assembly 200.2 or a compressor portion of a supercharger, and/or the turbine rotor 30 of turbine 18 a turbocharger assembly 200.2.

At room temperature, a minimum tip clearance 212 between the shroud portion 82, 82', 210 of the fluid-conduit housing 74, 74', 142, 158 and at least one tip 120 of the at least one bladed rotor 30, 56 is less than 4 percent of a radius of the at least one bladed rotor 30, 56 at the at least one tip 120 of the bladed rotor 30, 56 at a location of minimum tip clearance 212 to the shroud portion 82, 82', 210 of the fluid-conduit housing 74, 74', 142, 158.

When incorporated in the turbine portion 18 of a turbocharger assembly 200.2, the bladed rotor 30 comprises the turbine rotor 30 of the turbocharger assembly 200.2, the fluid-conduit housing 158 comprises an turbocharger exhaust housing 158 configured to receive exhaust gases 21 from an internal combustion engine 14, 14.2, and a portion of the turbocharger exhaust housing 158 comprises the shroud portion 210 that substantially concentrically surrounds the portion of the turbine rotor 30. In one set of embodiments, the turbocharger exhaust housing 158 comprises a volute portion 204$^{i'}$ of the fluid conduit 216 that is operative between the inlet 160 and the turbine rotor 30, at least a portion of an aft boundary 206$^{i}$ of the volute portion 204$^{i'}$ comprises a surface of revolution 206$^{i'}$ about the axis of rotation 202' of the turbine rotor 30 where the fluid 21 is discharged from the volute portion 204$^{i'}$ onto the turbine rotor 30 during operation of the turbocharger assembly 200.2, and the aft boundary 206$^{i}$ is located further from the centerbody 33 than a corresponding opposing forward boundary 207$^{i}$ of the volute portion 204$^{i'}$. For example, in one embodiment the surface of revolution 206$^{i'}$ comprises a planar surface that is substantially perpendicular to the axis of rotation 202'. Each radial pin 222 being slideable in at least one of a corresponding radial bore 228 in the turbocharger exhaust housing 158 and a corresponding radial bore 228 in the centerbody 33 provides for maintaining the concentricity of the shroud portion 210 of the turbocharger exhaust housing 158 relative to the turbine rotor 30 regardless of thermal expansion of the turbocharger exhaust housing 158 relative to the centerbody 33, so that at room temperature, the tip clearance 212 between the shroud portion 210 of the turbocharger exhaust housing 158 and at least one tip 120 of the turbine rotor 30 at an aft portion thereof can be less than 4 percent of a radius of the turbine rotor 30 at the at least one tip 120 of the turbine rotor 30 at the aft portion thereof. A seal 246 operative between an end face 248 of the turbocharger exhaust housing 158 and the centerbody 33—for example, operative within a groove 250 in the end face 248 of the turbocharger exhaust housing 158—provides for preventing the exhaust gases 21 from escaping the turbocharger exhaust housing 158 from a gap 234, 252 between the turbocharger exhaust housing 158 and the centerbody 33, wherein the seal 246 is configured so as to provide for accommodating thermal expansion or contraction of the turbocharger exhaust housing 158 relative to the centerbody 33. For example, the seal 246 may comprise either a thermal gasket 254, or a metallic seal 256, for example, comprising a radial cross-section selected from the group consisting of a V-shaped cross-section 258 and a C-shaped cross-section 260. In one set of embodiments, the external cylindrical surface 220 is stepped into the corresponding side 33.1 of the centerbody 33, and the seal 246 is operative between the end face 248 and a radial surface 262 extending radially outwards from the external cylindrical surface 220 that is stepped into the corresponding side 33.1 of the centerbody 33. In another set of embodiments, a heat shield 266 is operative between the centerbody 33 and the turbine rotor 30 within an axial bore 268 in the turbocharger exhaust housing 158, wherein the axial bore 268 has a diameter in excess of a maximum diameter of the turbine rotor 30.

When incorporated in the compressor portion 16 of a turbocharger assembly 200.2 or a supercharger, the at least one bladed rotor 56 comprises the bladed compressor rotor 56 and the at least one fluid-conduit housing 142 comprises a compressor housing 142 surrounding the compressor rotor 56, wherein the compressor housing 142 comprises central inlet 144 and a volute diffuser 146.

A method of operatively coupling a fluid-conduit housing 74, 74', 142, 158 to a centerbody 33 comprises:

a. sliding an internal cylindrical surface 110, 218 over a corresponding external cylindrical surface 112, 220, wherein the internal cylindrical surface 110, 218 is located at an end 158.2 of a fluid-conduit housing 74, 74', 142, 158, and the external cylindrical surface 112, 220 is located on a side 33.1 of a centerbody 33;

b. operatively coupling the fluid-conduit housing 74, 74', 142, 158 to the centerbody 33 using a plurality of radial pins 114, 222, wherein each radial pin 114, 222 of the plurality of radial pins 114, 222 extends radially across a junction 224 between the internal cylindrical surface 110, 218 and the external cylindrical surface 112, 220, each the radial pin 114, 222 engages both the centerbody 33 and a wall 110, 226 of the fluid-conduit housing 74, 74', 142, 158 so as to prevent more than insubstantial relative axial movement therebetween, and each radial pin 114, 222 of the plurality of radial pins 114, 222 is slideably engaged with at least one of a corresponding radial bore 228 in the fluid-conduit housing 74, 74', 142, 158 and a corresponding radial bore 228 in the centerbody 33;

c. providing for retaining each the radial pin 114, 222 in engagement with both the centerbody 33 and the wall 110, 226 of the fluid-conduit housing 74, 74', 142, 158; and d. shrouding a portion of a bladed rotor 30 with a portion of the fluid-conduit housing 74, 74', 142, 158, wherein the bladed rotor 30 is rotatable with respect to the centerbody 33 about an axis 202' that is substantially concentric with respect to the external cylindrical surface 112, 220 and with respect to the portion of the fluid-conduit housing 74, 74', 142, 158 that shrouds the bladed rotor 30.

In one set of embodiments, the method further comprises forming at least one of the corresponding radial bore 116, 228, 228.2 in the fluid-conduit housing 74, 74', 142, 158 and the corresponding radial bore 118, 228, 228.1 in the centerbody 33 after the operation of sliding the internal cylindrical surface 110, 218 over the corresponding external cylindrical surface 112, 220.

In another set of embodiments, the method further comprising providing a volute portion 204$^{i'}$ of a fluid conduit 216 within the fluid-conduit housing 142, 158 that extends forward of an aft boundary 206$^{i}$ of an outlet 208 of the fluid conduit 216 onto the bladed rotor 30 so as to provide for either a) a nominal direction of flow 264 of a fluid 21 onto or from the bladed rotor 30 that is substantially radial, b) for flow onto the bladed rotor 30, a nominal direction of flow 264 of a fluid 21 that is at least partially axially aftward relative to the centerbody 33 with decreasing distance from the bladed rotor 30 or, c) for flow from the bladed rotor 30, a nominal direction of flow 264 of a fluid 21 that is at least partially axially forward relative to the centerbody 33 with increasing distance from the bladed rotor 30.

A method of operating a bladed rotor 30, 56 in cooperation with an associated fluid-conduit housing 74, 74', 142, 158, comprises
   a. rotating a bladed rotor 30, 56 with a rotor shaft 32 rotationally supported from a centerbody 33;
   b. concentrically surrounding a portion of the bladed rotor 30, 56 with a shroud portion 82, 82', 210 of a fluid-conduit housing 74, 74', 142, 158 that is radially separated from the bladed rotor 30, 56 by an associated tip clearance 212; and
   c. causing the fluid-conduit housing 74, 74', 142, 158 to be heated relative to the centerbody 33, thereby thermally expanding the fluid-conduit housing 74, 74', 142, 158 relative to the centerbody 33 in a radial direction by action of a plurality of radial pins 114, 222 operative between the centerbody 33 and the fluid-conduit housing 74, 74', 142, 158, wherein the plurality of radial pins 114, 222 provide for unrestrained relative radial movement of the fluid-conduit housing 74, 74', 142, 158 relative to the centerbody 33, the plurality of radial pins 114, 222 provide for axially retaining the fluid-conduit housing 74, 74', 142, 158 against the centerbody 33, and the plurality of radial pins 114, 222 provides for substantially maintaining a concentricity of the shroud portion 82, 82', 210 of the fluid-conduit housing 74, 74', 142, 158 relative to the portion of the bladed rotor 30, 56 responsive to the operation of thermally expanding the fluid-conduit housing 74, 74', 142, 158.

In one set of embodiments, the fluid-conduit housing 158 comprises an turbocharger exhaust housing 158 of the turbocharger assembly 200.2, the bladed rotor 30 comprises a turbine rotor 30 of a turbocharger assembly 200.2 driven by exhaust gases 21 of an internal combustion engine 14, 14.2 directed through a portion of a fluid conduit 216 within the turbocharger exhaust housing 158 onto the turbine rotor 30, for example, through a volute 204$^i$ in a region that extends forward of an aft boundary 206$^i$ of an outlet 208 of the volute 204$^i$ onto the turbine rotor 30 so as to provide for a direction of flow 264 of the exhaust gases 21 onto the turbine rotor 30 that is either substantially radially inwards or at least partially axially aftward from the centerbody 33 with decreasing distance from the turbine rotor 30.

In another set of embodiments, the fluid-conduit housing 142 comprises a compressor housing 142 of a turbocharger assembly 200.2, and the bladed rotor 56 comprises a compressor rotor 56 of the turbocharger assembly 200.2 that provides for compressing and pumping air into a portion of a fluid conduit 216 within the compressor housing 142 and then into an internal combustion engine 14, 14.2.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an" and the corresponding associated definite articles "the' or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A turbocharger compressor rotor alignment system, comprising:
   a. a rotor shaft;
   b. at least one inner race of a rolling-element bearing, wherein a forward-end portion of said rotor shaft extends through said at least one inner race of said rolling-element bearing;
   c. a boreless-hub compressor rotor incorporating an aftwardly-extending internally-threaded boss that engages a corresponding externally-threaded forward end portion of said forward-end portion of said rotor shaft, wherein an internal surface of said at least one inner race of said rolling-element bearing is in engagement with both an external surface of said forward-end portion of said rotor shaft and an external surface of said internally-threaded boss of said boreless-hub compressor rotor, and said forward-end portion of said rotor shaft is a single piece.

2. A turbocharger compressor rotor alignment system as recited in claim 1, wherein said at least one inner race comprises forward and aft inner races.

3. A turbocharger compressor rotor alignment system as recited in claim 2, wherein a plurality of rolling elements of said rolling-element bearing are axially centered about a junction between said forward and aft inner races.

4. A turbocharger compressor rotor alignment system as recited in claim 1, wherein said at least one inner race is clamped between a shoulder of said forward-end portion of said rotor shaft and an aft surface of said boreless-hub compressor rotor by action of said internally-threaded boss on said externally-threaded forward end portion of said forward-end portion of said rotor shaft.

5. A turbocharger compressor rotor alignment system as recited in claim 1, wherein the diameter of said external surface of said internally-threaded boss is substantially the same as the diameter of said external surface of said forward-end portion of said rotor shaft.

* * * * *